(12) United States Patent
Tamura et al.

(10) Patent No.: US 10,889,178 B2
(45) Date of Patent: Jan. 12, 2021

(54) IN-WHEEL MOTOR DRIVE DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 112 days.

(21) Appl. No.: 16/334,877

(22) PCT Filed: Sep. 21, 2017

(86) PCT No.: PCT/JP2017/034060
§ 371 (c)(1),
(2) Date: Mar. 20, 2019

(87) PCT Pub. No.: WO2018/061968
PCT Pub. Date: Apr. 5, 2018

(65) Prior Publication Data
US 2020/0016972 A1    Jan. 16, 2020

(30) Foreign Application Priority Data

Sep. 30, 2016  (JP) ................................. 2016-193755

(51) Int. Cl.
*B60K 7/00* (2006.01)
*B60G 7/00* (2006.01)
(Continued)

(52) U.S. Cl.
CPC ............ *B60K 7/0007* (2013.01); *B60G 7/008* (2013.01); *B60K 17/043* (2013.01); *B62D 7/18* (2013.01);
(Continued)

(58) Field of Classification Search
CPC ........................... B60K 7/0007; B60K 7/0038
(Continued)

(56) References Cited

U.S. PATENT DOCUMENTS 5,087,229 A * 2/1992 Hewko ................ B60K 7/0007
180/65.51
5,127,485 A * 7/1992 Wakuta ................ B60K 7/0007
180/65.51
(Continued)

FOREIGN PATENT DOCUMENTS

EP        2 500 198        9/2012
JP        10-304645        11/1998
(Continued)

*Primary Examiner* — Jeffrey J Restifo
(74) *Attorney, Agent, or Firm* — Clark & Brody LP

(57) ABSTRACT

An in-wheel motor drive device includes: a wheel hub bearing portion having an inner ring integrally rotating with a wheel, an outer ring facing the inner ring via a radial gap, and a hub attachment arranged on a more outer diameter side than the outer ring and mounted and fixed to the outer ring; a motor portion driving the inner ring; a casing housing a rotation transmission path from a motor rotation shaft of the motor portion to the inner ring; a suspending bracket having an upper joining seat portion joinable with an upper side suspension member of a suspension device, a lower joining seat portion joinable with a lower side suspension member of the suspension device, and an intermediate portion connecting the upper joining seat portion and the lower joining seat portion; and fixing means for mounting and fixing the suspending bracket to the hub attachment.

14 Claims, 27 Drawing Sheets

(51) Int. Cl.
*B60K 17/04* (2006.01)
*B62D 7/18* (2006.01)
*B62D 7/22* (2006.01)
*F16D 65/092* (2006.01)

(52) U.S. Cl.
CPC ...... *B62D 7/228* (2013.01); *B60K 2007/0038* (2013.01); *B60K 2007/0061* (2013.01); *F16D 65/092* (2013.01)

(58) Field of Classification Search
USPC ...................................................... 180/65.51
See application file for complete search history.

(56) References Cited

U.S. PATENT DOCUMENTS

| | | | | |
|---|---|---|---|---|
| 5,150,763 A * | 9/1992 | Yamashita | ........... | B60K 7/0007 180/242 |
| 5,163,528 A * | 11/1992 | Kawamoto | ........... | B60L 3/0046 180/65.51 |
| 6,386,553 B2 * | 5/2002 | Zetterstrom | ............. | B60G 3/20 180/413 |
| 7,121,367 B2 * | 10/2006 | Ajiro | ................... | B60K 7/0007 180/65.51 |
| 7,350,605 B2 * | 4/2008 | Mizutani | ............. | B60K 7/0007 180/65.51 |
| 7,537,071 B2 * | 5/2009 | Kamiya | ................... | B60G 3/20 180/298 |
| 7,537,223 B2 * | 5/2009 | Zetterstroem | .......... | B60G 3/265 280/5.52 |
| 7,641,010 B2 * | 1/2010 | Mizutani | ............. | B60K 17/046 180/65.51 |
| 7,703,780 B2 * | 4/2010 | Mizutani | ................ | B60G 13/16 280/124.1 |
| 7,735,588 B2 * | 6/2010 | Murata | .................... | B60L 7/24 180/65.51 |
| 7,789,178 B2 * | 9/2010 | Mizutani | ............. | B60K 7/0007 180/65.51 |
| 7,828,095 B2 * | 11/2010 | Murata | ................ | B60K 17/046 180/65.51 |
| 7,938,211 B2 * | 5/2011 | Yoshino | .................. | F16D 51/18 180/65.51 |
| 7,938,212 B2 * | 5/2011 | Sakuma | .................. | H02K 9/19 180/65.51 |
| 7,958,959 B2 * | 6/2011 | Yogo | ..................... | B60K 7/0007 180/65.51 |
| 7,975,789 B2 * | 7/2011 | Murata | ................ | B60K 7/0007 180/65.51 |
| 8,002,060 B2 * | 8/2011 | Komatsu | ................ | H02K 7/083 180/65.51 |
| 8,020,653 B2 * | 9/2011 | Mizutani | .............. | B60K 7/0007 180/65.51 |
| 8,132,636 B2 * | 3/2012 | Suzuki | ..................... | H02K 7/16 180/65.51 |
| 8,186,467 B2 * | 5/2012 | Yoshino | ............... | B60K 7/0007 180/65.51 |
| 8,453,774 B2 * | 6/2013 | Nagaya | .................. | B60K 17/30 180/65.51 |
| 8,581,457 B2 * | 11/2013 | Takahashi | ............ | B60K 7/0007 310/67 R |
| 8,596,395 B2 * | 12/2013 | Hirano | ................. | B60K 17/046 180/65.51 |
| 9,126,476 B2 * | 9/2015 | Takahashi | ............ | G01L 5/0009 |
| 9,731,572 B2 * | 8/2017 | Tamura | ................ | B60K 7/0007 |
| 9,796,235 B2 * | 10/2017 | Matayoshi | ........... | B60G 15/067 |
| 10,150,359 B2 * | 12/2018 | Tamura | ................ | B60K 7/0007 |
| 10,414,264 B2 * | 9/2019 | Tamura | .................... | B60B 27/00 |
| 10,464,384 B2 * | 11/2019 | Ishikawa | .............. | B60K 17/046 |
| 10,632,938 B2 * | 4/2020 | Tamura | ................ | B60R 16/0207 |
| 10,668,803 B2 * | 6/2020 | Tamura | ................ | B60K 17/356 |
| 10,675,965 B2 * | 6/2020 | Tamura | ..................... | F16H 1/06 |
| 10,675,966 B2 * | 6/2020 | Yamada | .................... | F16H 57/043 |
| 10,723,288 B2 * | 7/2020 | Okamoto | ............. | B60K 7/0007 |
| 2004/0112657 A1 | 6/2004 | Ajiro et al. | | |
| 2009/0133944 A1 * | 5/2009 | Nishioka | ................ | B60G 3/20 180/65.51 |

FOREIGN PATENT DOCUMENTS

| | | |
|---|---|---|
| JP | 2004-175175 | 6/2004 |
| JP | 2011-105068 | 6/2011 |
| JP | 2013-126280 | 6/2013 |
| JP | 2013-226994 | 11/2013 |
| JP | 2015-128960 | 7/2015 |
| JP | 2015-214273 | 12/2015 |
| JP | 6125083 | 5/2017 |
| JP | 2017-171272 | 9/2017 |

* cited by examiner

VEHICLE WIDTH DIRECTION INSIDE

VEHICLE WIDTH DIRECTION OUTSIDE

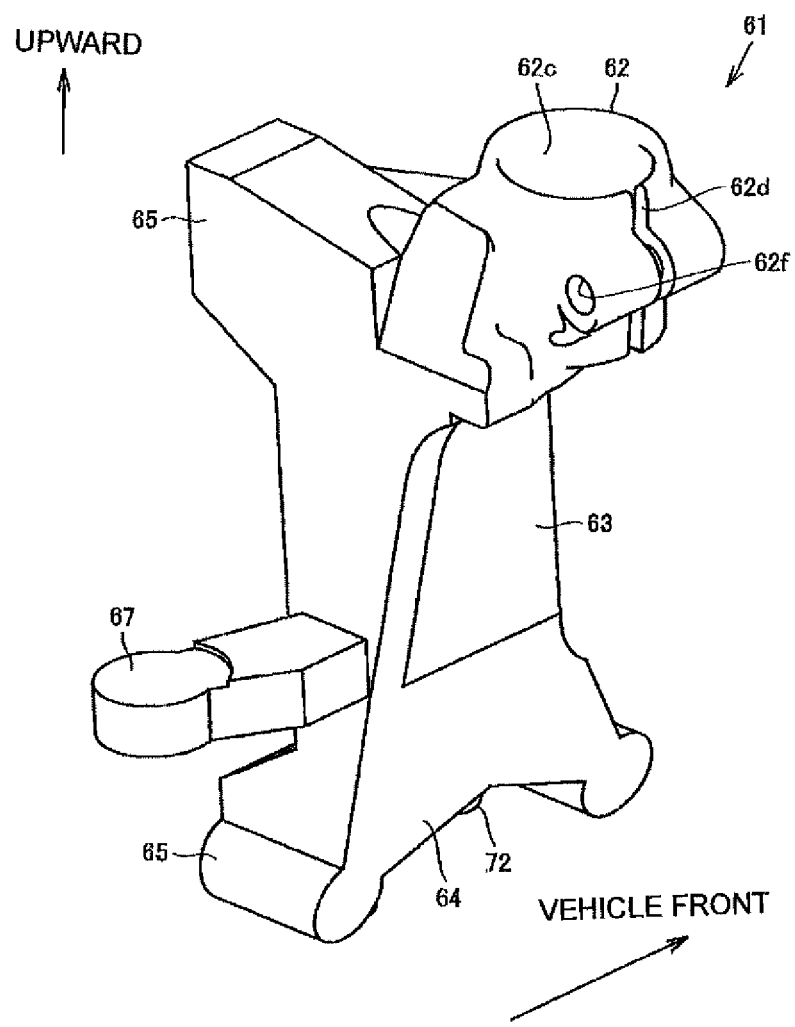

VEHICLE WIDTH DIRECTION OUTSIDE ← → VEHICLE WIDTH DIRECTION INSIDE

UPWARD

VEHICLE WIDTH DIRECTION OUTSIDE ← → VEHICLE WIDTH DIRECTION INSIDE

IN-WHEEL MOTOR DRIVE DEVICE

TECHNICAL FIELD

The present invention relates to a structure for joining an in-wheel motor drive device to a suspension device.

BACKGROUND ART

The in-wheel motor drive device arranged in an inner space region of a wheel is joined to a suspension device of a vehicle body side. As such a joining structure, for example, the one described in Japanese Unexamined Patent Publication No. 2015-214273 (Patent Literature 1) is known. The housing of the in-wheel motor described in Patent Literature 1 is composed of a housing body and a lid member. A socket of a ball joint is formed on the lid member. The socket houses a ball portion of a ball stud erected on an end of a lower arm of a suspension. Thus, the in-wheel motor is joined to the suspension member.

CITATION LIST

Patent Literature

Patent Literature 1: Japanese Unexamined Patent Publication No. 2015-214273

SUMMARY OF INVENTION

Technical Problem

However, the inventor of the present invention has found that there is a need to further improve the reliability in the above-described conventional joining structure. That is, the lid member also serves as the bottom wall of an oil reservoir and is joined to the housing main body with a bolt. There is a concern that if an excessive external force acts on the socket of the ball joint from the lower arm, oil leaks from the joint between the housing body and the lid member. Since such oil adheres to the wheels and reduces the frictional resistance between the tire and the ground contact surface, oil leakage in the in-wheel motor is not particularly preferable.

In addition, in the above-described conventional joining structure, there is a concern about insufficient rigidity of the oil reservoir. The housing part defining the oil reservoir is generally thin-walled and not rigid. Insufficient rigidity of the joint between the ball joint and the lid member may cause bad influence on the alignment of the suspension.

In view of the above circumstances, it is an object of the present invention to provide a highly reliable in-wheel motor drive device by improving a joining structure between a suspension device and an in-wheel motor drive device.

Solution to Problem

To this end, an in-wheel motor drive device according to the first invention includes: a wheel hub bearing portion having an inner ring integrally rotating with a wheel, an outer ring facing the inner ring via a radial gap, a plurality of rolling elements interposed in the radial gap, and a hub attachment arranged on a more outer diameter side than the outer ring and mounted and fixed to the outer ring; a motor portion driving the inner ring; a casing housing a rotation transmission path from a motor rotation shaft of the motor portion to the inner ring; a suspending bracket having an upper joining seat portion and a lower joining seat portion joinable with a suspension device and an intermediate portion connecting the upper joining seat portion and the lower joining seat portion; and fixing means for mounting and fixing the suspending bracket to the hub attachment.

According to the present invention, even if an excessive external force is applied from the wheel side to the wheel hub bearing portion, the suspending bracket can receive the excessive external force and transmit it to the suspension device. Therefore, the excessive external force is not transmitted to the casing of the in-wheel motor drive device, and it is possible to protect the in-wheel motor drive device so as not to cause undesired deformation therein. It is to be noted that the inner ring is not limited to be annular as long as it is arranged coaxially in the outer ring. The inner ring may be a solid shaft body. Supplementally explaining the suspending bracket, the upper joining seat portion is located relatively upper side and the lower joining seat portion is located relatively lower side. The intermediate portion extends in the vertical direction, joins with the upper joining seat portion on the upper side of the intermediate portion, and joins with the lower joining seat portion on the lower side of the intermediate portion. The suspending bracket may have any shape as long as it includes such an upper joining seat portion, an intermediate portion, and a lower joining seat portion, thus the shape of the suspending bracket is not particularly limited. While the suspension member of the suspension device joined with the upper joining seat portion or the lower joining seat portion is not particularly limited, the upper joining seat portion is joined with, for example, a strut or damper of the suspension device, and the lower joining seat portion is joined with, for example, a lower arm of the suspension device.

As one embodiment of the present invention, the casing is interposed between the hub attachment and the suspending bracket; the suspending bracket has a protruding portion extending towards the wheel hub bearing portion and coming into contact with the hub attachment; and the fixing means mounts and fixes the protruding portion to the hub attachment. According to this embodiment, an excessive external force can be directly transmitted from the wheel hub bearing portion to the suspending bracket. Also in relation to the axial direction of the wheel hub bearing portion, the wheel hub bearing portion, the casing, and the suspending bracket can be arranged in this order.

As a preferred embodiment of the present invention, the rotation transmission path further includes a rolling bearing that includes an input gear coupled with the motor rotating shaft and an output gear coupled with the inner ring, is arranged on one side and the other side, respectively, in the axial direction of the output gear, and rotatably supports the output gear. Regarding the axis of the wheel hub bearing portion, the end surface of the protruding portion coming into contact with the hub attachment is arranged so that the axial direction position of the end surface is included in a range from the rolling bearing on one side in the axial direction to the rolling bearing on the other side in the axial direction. According to this embodiment, the suspension device can be brought close to the wheel, and the suspension characteristics are improved. It is to be noted that an intermediate gear may be interposed between these input and output gears. Also, the intermediate gears may be one in number or may be a large-diameter gear and a small-diameter gear engaged with each other.

As a preferred embodiment of the present invention, the suspending bracket has three or more of the protruding portions; and regarding the axis of the wheel hub bearing portion, the suspending bracket and the hub attachment define an opening that opens in the direction perpendicular to the axis between the protruding portions adjacent to each other, and the casing is exposed from the opening. According to this embodiment, the protruding portion of the suspending bracket acts as a leg portion extending from the suspending bracket body to separate the suspending bracket body from the hub attachment. Then, the casing can be sandwiched between the suspending bracket body and the hub attachment.

As another embodiment of the invention, the casing is interposed between the hub attachment and the suspending bracket; and the fixing means includes the suspending bracket aligned in the axial direction, the casing, and a bolt passing through the hub attachment. According to this embodiment, the fixing means fastens the wheel hub bearing portion, the casing, and the suspending bracket together. Thus, the means for fixing the casing to the wheel hub bearing portion can be omitted. As another embodiment, a fixing means for mounting and fixing the suspending bracket to the wheel hub bearing portion and a second fixing means for fixing the casing to the wheel hub bearing portion may be provided.

As one embodiment of the present invention, the fixing means has a bolt passing through the suspending bracket and the hub attachment; and three or more of the bolts are present and arranged further upward and downward than the axis of the wheel hub bearing portion. According to the embodiment, the joining rigidity of the suspending bracket and the hub attachment can be increased.

As a preferred embodiment of the present invention, the casing is formed in a plane perpendicular to the axis of the wheel hub bearing portion, so as to protrude forward and rearward of the vehicle from a polygonal region where the bolts adjacent to each other are connected to each other with a straight line. According to this embodiment, the suspending bracket can be mounted and fixed to the hub attachment at a center portion in the front/rear direction of the casing with respect to the vehicle front/rear direction.

As a more preferable embodiment of the present invention, a steering axis of a wheel is further included; and the suspending bracket and the steering axis are arranged so as to overlap with each other as viewed in the vehicle front/rear direction. According to this embodiment, the in-wheel motor drive device can be smoothly steered, and the steering characteristic is not deteriorated.

As an even more preferred embodiment of the present invention, the bolt is arranged in the vehicle ahead and behind of the steering axis. According to this embodiment, the joining rigidity of the suspending bracket and the hub attachment can be increased.

As one embodiment of the present invention, the rotation transmission path includes an input gear coupled with the motor rotation shaft and an output gear coupled with the inner ring; and the hub attachment, the output gear, and the suspending bracket are arranged so as to overlap with one another as viewed in the axial direction of the wheel hub bearing portion. According to this embodiment, the hub attachment and the suspending bracket can be concentrated on the axle. It is to be noted that an intermediate gear may be interposed between these input and output gears. Also, the intermediate gears may be one in number or may be a large-diameter gear and a small-diameter gear engaged with each other.

As one embodiment of the present invention, the suspending bracket and the motor portion are arranged so as to overlap with each other as viewed in the vehicle front/rear direction. According to this embodiment, the suspension device can be brought close to the wheel, and the suspension characteristics are improved.

In order to improve the rigidity, the suspending bracket is preferably formed of one member, and the lower joining seat portion, the upper joining seat portion, and the intermediate portion are integrally formed. Alternatively, the suspending bracket may be an assembly, and the lower joining seat portion, the upper joining seat portion, and the intermediate portion may be separate members. An in-wheel motor drive device according to the second invention includes: a wheel hub bearing portion having an inner ring integrally rotating with a wheel, an outer ring facing the inner ring via a radial gap, a plurality of rolling elements interposed in the radial gap, and a hub attachment arranged on a more outer diameter side than the outer ring and mounted and fixed to the outer ring; a motor portion driving the inner ring; a casing housing a rotation transmission path from a motor rotation shaft of the motor portion to the inner ring; a suspending bracket having a vertically extending damper external cylinder, a lower joining seat portion provided at the lower end portion of the damper external cylinder and joinable with an arm of a suspension device, and a block provided on an outer circumference of the damper external cylinder; and fixing means for mounting and fixing the block to the hub attachment. According to the second invention, the degree of freedom in designing the suspension device is increased by providing the block as a separate member from the lower joining seat portion. Also, it is possible to lengthen the damper downward and bring the damper lower end close to the arm.

As a preferred embodiment of the present invention, the suspending bracket further includes a tie rod joining seat portion for joining with a tie rod of a steering device. According to this embodiment, it is possible to steer the in-wheel motor drive device. As another embodiment, the tie rod joining seat portion may be omitted. Alternatively, as another embodiment, the tie rod joining seat portion may be provided in the casing of the in-wheel motor drive device.

As a preferred embodiment of the present invention, the suspending bracket further includes a brake caliper joining seat portion for joining with a brake caliper. According to this embodiment, it is possible to attach a brake caliper to the in-wheel motor drive device. As another embodiment, the brake caliper joining seat portion may be omitted. Alternatively, as another embodiment, the brake caliper joining seat portion may be provided on the casing of the in-wheel motor drive device.

Advantageous Effects of Invention

As described above, according to the present invention, it is possible to provide a highly reliable in-wheel motor drive device and the operation performance and traveling safety are enhanced.

BRIEF DESCRIPTION OF DRAWINGS

FIG. 7A is a perspective view showing a suspending bracket taken out from the first embodiment.

DESCRIPTION OF EMBODIMENTS

Figure 1:
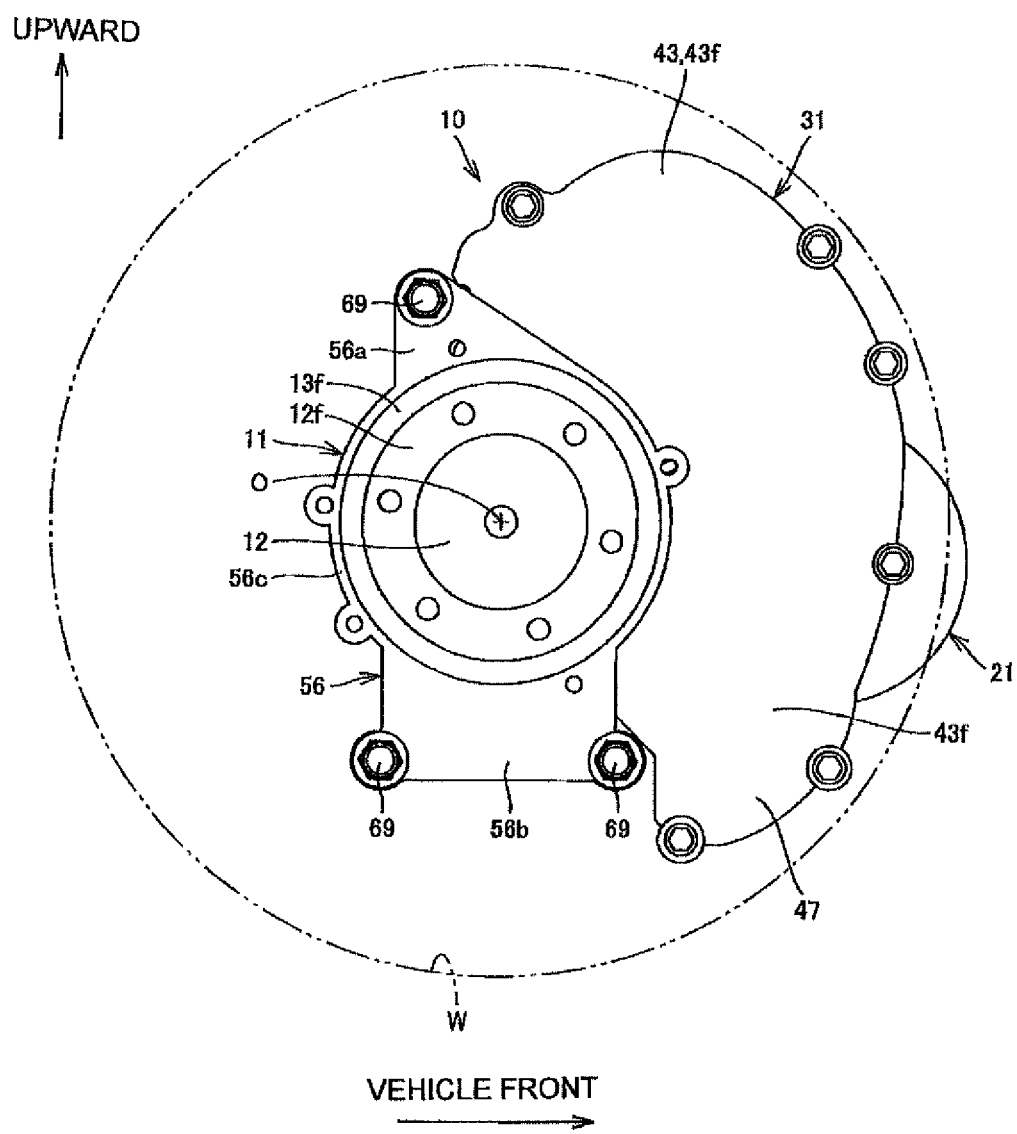
FIG. 1 is a front view schematically showing an in-wheel motor drive device.
Figure 2:
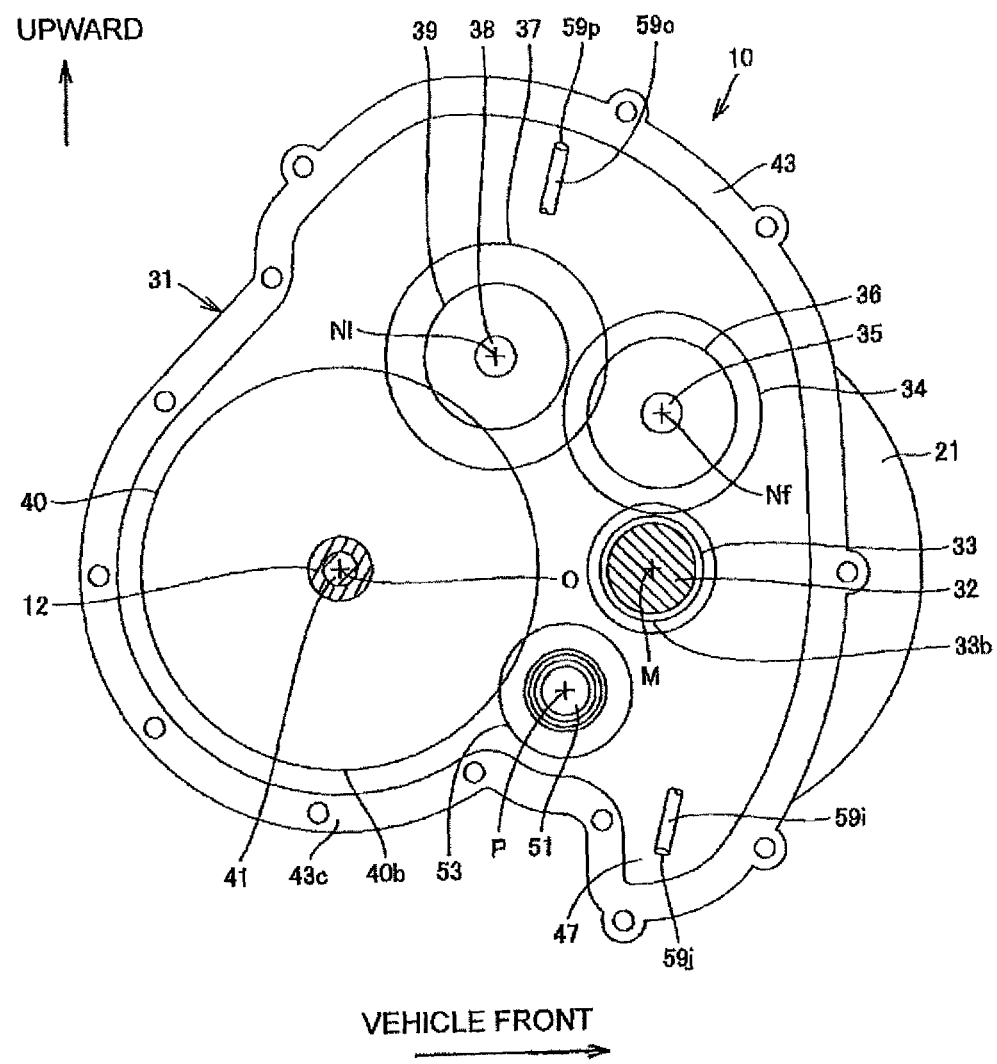
FIG. 2 is a transverse sectional view schematically showing an in-wheel motor drive device.
Figure 3:
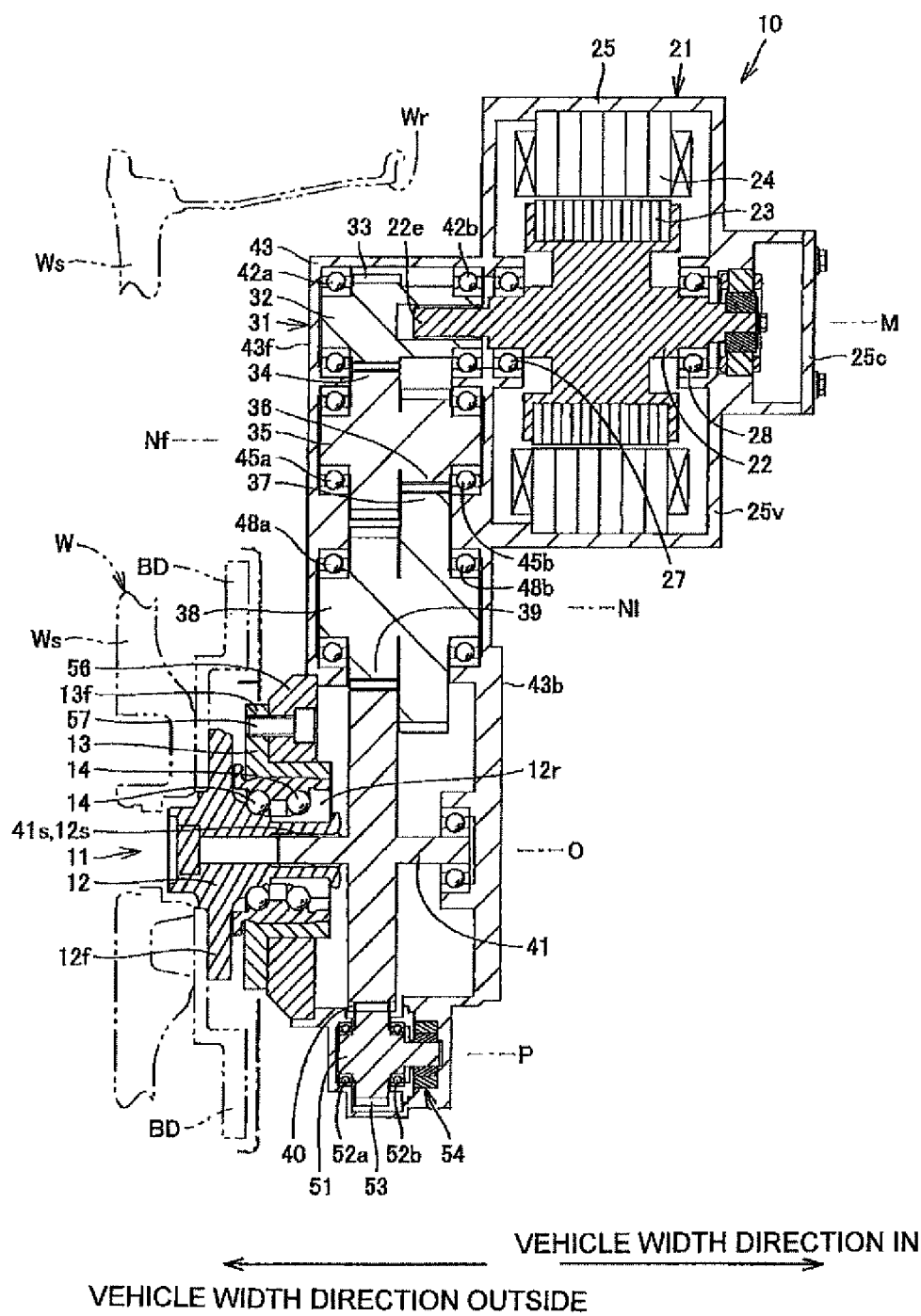
FIG. 3 is an expanded sectional view showing an in-wheel motor drive device.

Embodiments of the present invention will be described below in detail with reference to the drawings. First, the internal structure of the in-wheel motor drive device as the basis of the present invention will be described. FIG. 1 is a front view showing the in-wheel motor drive device. FIG. 2 is a transverse sectional view schematically showing the in-wheel motor drive device. FIG. 1 and FIG. 2 show a state of being viewed from the vehicle width direction outside. In FIG. 2, each gear inside of a speed reduction portion is represented by an addendum circle and illustration of each tooth is omitted. FIG. 3 is an expanded sectional view schematically showing the in-wheel motor drive device. The cut section shown by FIG. 3 is an expanded plane in which a plane including an axis M and an axis Nf shown in FIG. 2, a plane including the axis Nf and an axis Nl, a plane including the Nl and an axis O, and a plane including the axis O and an axis P are connected in this order.

An in-wheel motor drive device 10 includes a wheel hub bearing portion 11, a motor portion 21, and a speed reduction portion 31 that decelerates the rotation of the motor portion 21 and transmits the reduced rotation to the wheel hub bearing portion 11, and is symmetrically arranged on the both vehicle width direction right and left sides of an electric vehicle (not shown). At this time, as shown in FIG. 3, the wheel hub bearing portion 11 is arranged on the vehicle width direction outside, the motor portion 21 is arranged on the vehicle width direction inside, and the speed reduction portion 31 is arranged in a vehicle width direction center portion.

The in-wheel motor drive device 10 is arranged in an inner space region of a road wheel W represented by an imaginary line in FIG. 1 and is joined with a center of the road wheel W represented by an imaginary line in FIG. 3, thereby driving the road wheel W of the wheel. It is to be noted that although not shown, a tire is mounted on the outer circumference of the road wheel W.

Each in-wheel motor drive device 10 is joined with the vehicle body of the electric vehicle via a suspension device not shown. The in-wheel motor drive device 10 is capable of causing an electric vehicle to run at a speed of 0 to 180 km/h on a public road.

As shown in FIG. 1 and FIG. 2, the motor portion 21 and the speed reduction portion 31 are not arranged coaxially with the axis O of the wheel hub bearing portion 11, but are arranged offset in a direction perpendicular from the axis O of the wheel hub bearing portion 11 as shown in FIG. 3. That is, the in-wheel motor drive device 10, as will be described in detail later, includes a portion arranged forward of the vehicle, a portion arranged rearward of the vehicle, a portion arranged upward, and a portion arranged downward.

As shown in FIG. 3, the wheel hub bearing portion 11 includes an inner ring 12 as a hub wheel coupled with the road wheel W, a non-rotating outer ring 13, a plurality of rolling elements 14 arranged in an annular gap between the inner ring 12 and the outer ring 13, and a hub attachment 56, and thus constituting an axle. The inner ring 12 is longer than the outer ring 13 and is passing through the center hole of the outer ring 13 so that both ends of the inner ring 12 protrude from the outer ring 13. A flange portion 12f is formed at one end of the axis O direction of the inner ring 12. An inner bearing ring 12r is mounted and fixed to the outer circumference of the other end in the axis O direction of the inner ring 12.

The rolling elements 14 are arranged in double rows separated in the axis O direction. The outer circumferential surface of the center portion in the axis O direction of the inner ring 12 constitutes an inner raceway surface of the rolling elements 14 of the first row and faces the inner circumferential surface of one side of the axis O direction of the outer ring 13. The outer circumferential surface of the inner bearing ring 12r constitutes an inner raceway surface of the rolling elements 14 of the second row and faces the inner circumferential surface of the other side of the axis O direction of the outer ring 13. In the following description, the vehicle width direction outside (outboard side) is also referred to as one side of the axis O direction and the vehicle width direction inside (inboard side) is also referred to as the other side of the axis O direction. The right/left direction of the page of FIG. 3 corresponds to the vehicle width direction. The inner circumferential surface of the outer ring 13 constitutes the outer raceway surface of the rolling element 14.

The flange portion 12f of the inner ring 12 is arranged on the more vehicle width direction outside than the outer ring 13 and faces one end in the axis O direction of the outer ring 13. The flange portion 12f constitutes a coupling seat portion for coupling coaxially with a brake disc BD and a spoke portion Ws of the road wheel W. The inner ring 12 is coupled with the brake disc BD and the road wheel W at the flange portion 12f and rotates integrally with the road wheel W. As a variation not illustrated, the flange portion 12f may be a protruding portion that protrudes towards the outer diameter side spaced in the circumferential direction.

A flange portion 13f is formed on the outer ring 13. The hub attachment 56 is joined and fixed to the flange portion 13f with a bolt 57. The hub attachment 56 has a through hole for receiving the outer ring 13 and serves to expand the outer ring 13 toward the outer diameter side. The bolt 57 is inserted into a round hole formed in the hub attachment 56 from the axis O direction inside and screwed into a female screw hole formed in the flange portion 13f. Further, the bolts 57 are arranged at circumferentially equal intervals with the axis O as the center.

Figure 4A:
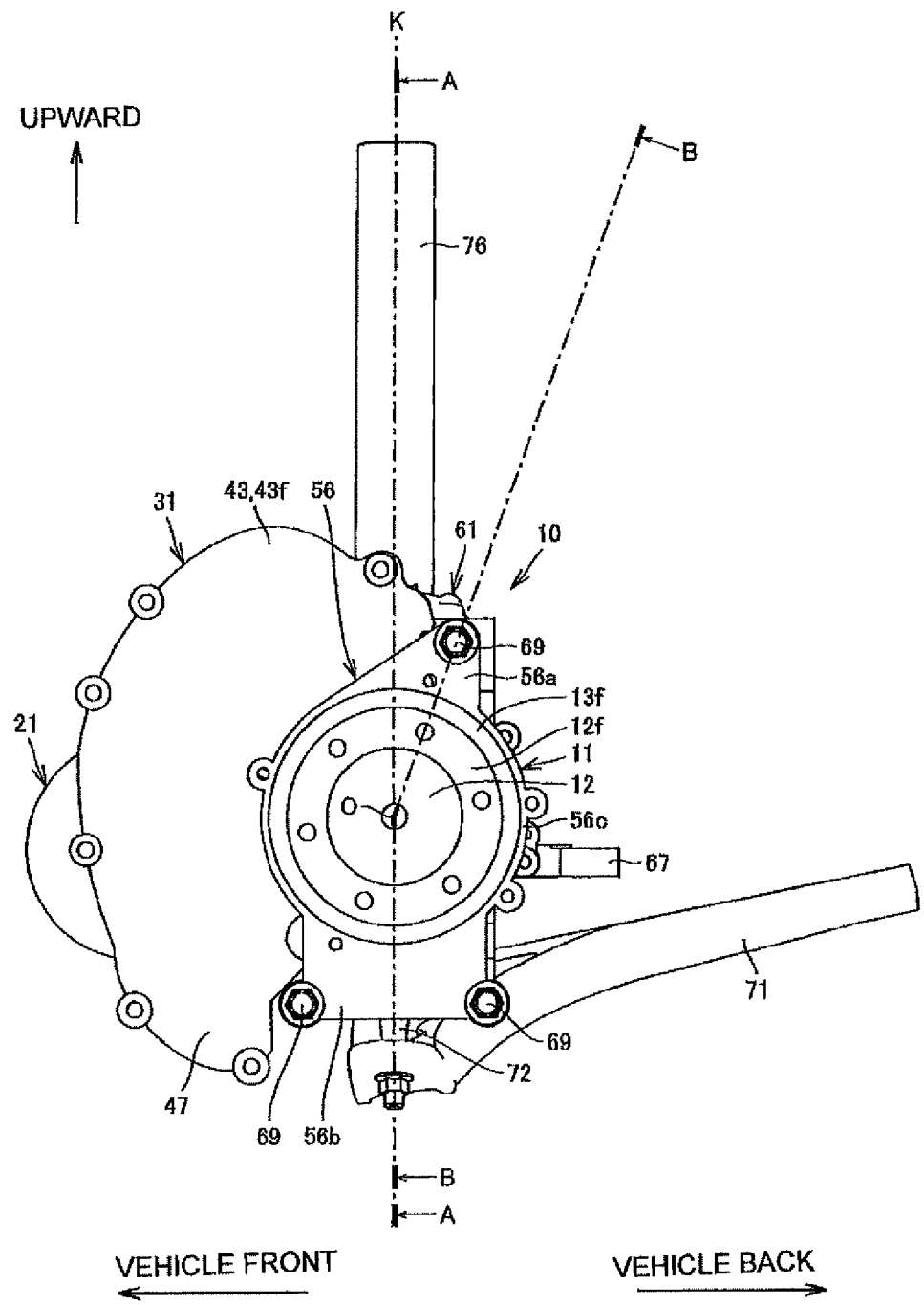
FIG. 4A is a front view showing the in-wheel motor drive device according to a first embodiment of the present invention together with a suspension device.

The outer ring 13 is circular. On the other hand, as shown in FIG. 4A, the hub attachment 56 is a plate-like member including a circular portion 56c, an upper side portion 56a protruding upward from the circular portion 56c, and a lower side portion 56b protruding downward from the circular portion 56c. A main body casing 43, which will be described later, is mounted and fixed to the circular portion 56c with a bolt (not shown). The upper side portion 56a is, for example, a triangular shape tapered at the upper end. The lower side portion 56b is, for example, rectangular. In the hub attachment 56, a female screw hole for joining with the main body casing 43 and a suspending bracket 61 described later is formed. Each of the members of the wheel hub bearing portion 11 described so far is made of steel.

As shown in FIG. 3, the motor portion 21 includes a motor rotation shaft 22, a rotor 23, a stator 24, and a motor casing 25, which are sequentially arranged from the axis M of the motor portion 21 to the outer diameter side in this order. While the motor portion 21 is a radial gap motor of an inner rotor and an outer stator type, it may be of another type. For example, though not illustrated, the motor portion 21 may be an axial gap motor.

The axis M that becomes a rotation center of the motor rotation shaft 22 and the rotor 23 extends in parallel to the axis O of the wheel hub bearing portion 11. That is, the motor portion 21 is arranged so as to be offset away from the axis O of the wheel hub bearing portion 11. The axial direction position of the motor portion 21 does not overlap with the axis O direction position of the outer ring 13 and the hub attachment 56 as shown in FIG. 3. The motor casing 25 has a substantially cylindrical shape, and is coupled with a back surface portion 43b of the main body casing 43 at one end in the axis M direction and sealed with a bowl-shaped motor casing cover 25v at the other end in the axis M direction. Both end portions of the motor rotation shaft 22 are rotatably supported by the motor casing 25 via rolling bearings 27 and 28. The motor portion 21 drives the inner ring 12.

The speed reduction portion 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main body casing 43. The input shaft. 32 is a tubular body having a larger diameter than the end portion 22e of the motor rotation shaft 22 and extends along the axis M of the motor portion 21. The end portion 22e is received in the center hole of the other end portion of the axis M direction of the input shaft 32, and the input shaft 32 is coupled coaxially with the motor rotation shaft 22. Both ends of the input shaft 32 are supported by the main body casing 43 via rolling bearings 42a and 42b. More specifically, one end of the axis M direction of the input shaft 32 is supported by a front surface portion 43f via the rolling bearing 42a, and the other end of the axis M direction of the input shaft 32 is supported by the back surface portion 43b via a rolling bearing 42b. The input gear 33 is an externally toothed gear having a diameter smaller than the motor portion 21, and is coupled coaxially with the input shaft 32. More specifically, the input gear 33 is integrally formed on the outer circumference of the center portion of the axis M direction of the input shaft 32.

The output shaft 41 is an axis smaller in diameter than the inner ring 12, is coaxially coupled with the output gear 40, and extends along the axis O of the wheel hub bearing portion 11. The inner ring 12 has a cylindrical shape, and one end in the axis O direction of the output shaft 41 is inserted into the center hole of the other end in the axis O direction of the inner ring 12, so that the output shaft 41 is joined coaxially with the inner ring 12. Specifically, for instance, a spline groove is formed on the outer circumferential surface of the output shaft 41, a spline groove is formed on the inner circumferential surface of the other end of the axis O direction of the inner ring 12, and these spline grooves are spline-fitted. Such spline fitting realizes torque transmission between the output shaft 41 and the inner ring 12 and allows relative movement therebetween. The output gear 40 is an externally toothed gear, and is coupled coaxially with the output shaft 41. More specifically, the output gear 40 is integrally formed on the outer circumference of the other end of the axis O direction of the output shaft 41.

The two intermediate shafts 35 and 38 extend in parallel to the input shaft 32 and the output shaft 41. That is, the speed reduction portion 31 is a four-axis parallel shaft gear reducer, and the axis O of the output shaft 41, the axis Nf of the intermediate shaft 35, the axis Nl of the intermediate shaft 38, and the axis M of the input shaft 32 extend in parallel to each other, in other words, extend in the vehicle width direction.

The vehicle front/rear position of each axis will now be described. As shown in FIG. 2, the axis M of the input shaft 32 is arranged in the vehicle ahead of the axis O of the output shaft 41. Further, the axis Nf of the intermediate shaft 35 is arranged in the vehicle ahead of the axis M of the input shaft 32. The axis Nl of the intermediate shaft 38 is arranged in the vehicle ahead of the axis O of the output shaft 41 and behind of the axis M of the input shaft 32. As a variation that is not shown, the axis M of the input shaft 32 is arranged at an arbitrary position around the axis O, and the input shaft 32, the intermediate shaft 35, the intermediate shaft 38, and the output shaft 41 may be arranged in the vehicle front/rear direction in this order. In this case, the vertical position of each axis is determined by the front/rear direction position and the vertical direction position of the motor portion 21. It is to be noted that each of the shafts 32, 35, 38, and 41 constitutes a transmission order of the driving force in this order.

The vertical direction position of each axis will now be described. The axis M of the input shaft 32 and the axis O of the output shaft 41 are arranged at substantially the same vertical direction position. The axis Nf of the intermediate shaft 35 is arranged further upward than the axis M of the input shaft 32. The axis Nl of the intermediate shaft 38 is arranged further upward than the axis Nf of the intermediate shaft 35. It is to be noted that it is sufficient for the plurality of intermediate shafts 35 and 38 to be arranged further upward than the input shaft 32 and the output shaft 41, and the intermediate shaft 35 may be arranged further upward than the intermediate shaft 38 as a variation that is not shown. Alternatively, as a variation that is not shown, the output shaft 41 may be arranged further upward than the input shaft 32. In the variation in which the axis M of the input shaft 32 is arranged at the above-described arbitrary position around the axis O, the vertical direction positions of the input shaft 32, the intermediate shaft 35, the intermediate shaft 38, and the output shaft 41 are determined by the front/rear direction position and the vertical direction position of the motor.

The intermediate gear 34 and the intermediate gear 36 are externally toothed gears and are coupled coaxially with the center portion of the axis Nf direction of the intermediate shaft 35 as shown in FIG. 3. Both end portions of the intermediate shaft 35 are supported by the main body casing 43 via rolling bearings 45a and 45b. More specifically, one end of the axis Nf direction of the intermediate shaft 35 is supported by the front surface portion 43f via the rolling bearing 45a, and the other end of the axis Nf direction of the intermediate shaft 35 is supported by the back surface portion 43b via the rolling bearing 45b. The intermediate gear 37 and the intermediate gear 39 are externally toothed gears and are coupled coaxially with the center portion of the axis Nl direction of the intermediate shaft 38. Both end portions of the intermediate shaft 38 are supported by the main body casing 43 via rolling bearings 48a and 48b. More specifically, one end of the axis Nl direction of the intermediate shaft 38 is supported by the front surface portion 431 via the rolling bearing 48a, and the other end of the axis Nl direction of the intermediate shaft 38 is supported by the back surface portion 43b via the rolling bearing 48b.

The main body casing 43 forms an outline of the speed reduction portion 31 and the wheel hub bearing portion 11, is formed in a tubular shape, and surrounds the axes O, Nf, Nl, and M that extend in parallel to each other as shown in FIG. 2. Also, the main body casing 43 is housed in the inner space region of the road wheel W (FIG. 1). As shown in FIG. 3, the inner space region of the road wheel W is partitioned by an inner circumferential surface of a rim portion Wr and a spoke portion Ws coupled with one end of the axis O direction of the rim portion Wr. The wheel hub bearing portion 11, the speed reduction portion 31, and one axial region of the motor portion 21 are housed in the inner space region of the road wheel W. The other axial region of the motor portion 21 protrudes to the other axial direction from the road wheel W. Thus, the road wheel W houses most of the in-wheel motor drive device 10.

With reference to FIG. 2, the main body casing 43 protrudes downward in a position spaced apart in the vehicle front/rear direction from the axis O of the output gear 40, more specifically, immediately below the axis M of the input gear 33. This protruding portion forms an oil tank 47. On the other hand, a space is secured between a portion 43c immediately below the axis O of the main body casing 43 and a lower portion of the rim portion Wr. A suspension member (not shown) extending in the vehicle width direction is arranged in the space.

The tubular main body casing 43, as shown in FIG. 3, houses the input shaft 32, the input gear 33, the intermediate gear 34, the intermediate shaft 35, the intermediate gear 36, the intermediate gear 37, then intermediate shaft 38, the intermediate gear 39, the output gear 40, and the output shaft 41. Lubricating oil is sealed inside the main body casing 43. The input gear 33, the intermediate gear 34, the intermediate gear 36, the intermediate gear 37, the intermediate gear 39, and the output gear 40 are helical gears, and are lubricated and cooled by the lubricating oil.

As shown in FIG. 3, the main body casing 43 includes the substantially flat front surface portion 43f covering one side of the axial direction of the tubular portion of the speed reduction portion 31 and the substantially flat back surface portion 43b covering the other side of the axial direction of the tubular portion of the speed reduction portion 31. The back surface portion 43b is coupled with the motor casing 25. Further, the back surface portion 43b is coupled with the suspension member not shown such as an arm and a damper via a suspending bracket 61 (FIG. 4A, etc.) described later. As a result, the in-wheel motor drive device 10 is joined to the suspension device. It is to be noted that the arm, the damper, and the like of the suspension device are also referred to as vehicle body side members because they are mounted to the vehicle body side as viewed from the described member, i.e., here the in-wheel motor drive device 10. Since the main body casing 43, the motor casing 25, and the motor casing cover 25v are joined to the vehicle body side member via the suspending bracket, they are separated from the vehicle body side member.

The small-diameter input gear 33 and the large-diameter intermediate gear 34 are arranged on one side (on the flange section 12f side) in the axial direction of the speed reduction portion 31 and engage with each other. The small-diameter intermediate gear 36 and the large-diameter intermediate gear 37 are arranged on the other side (on the motor portion 21 side) in the axial direction of the speed reduction portion 31 and engage with each other. The small-diameter input gear 39 and the large-diameter intermediate gear 40 are arranged on one side (on the flange section 12f side) in the axial direction of the speed reduction portion 31 and engage with each other. In this way, the input gear 33, the plurality of intermediate gears 34, 36, 37, and 39 and the output gear 40 engage with each other and constitute a drive transmission path leading from the input gear 33 to the output gear 40 via the plurality of intermediate gears 34, 36, 37, and 39. By the engagement of the drive side small-diameter gears and the driven side large-diameter gears, the rotation of the input shaft 32 is decelerated by the intermediate shaft 35, the rotation of the intermediate shaft 35 is decelerated by the intermediate shaft 38, and the rotation of the intermediate shaft 38 is decelerated by the output shaft 41. As a result, the speed reduction portion 31 secures a sufficient reduction ratio. Among the plurality of intermediate gears, the intermediate gear 34 becomes the first intermediate gear located on the input side of the drive transmission path. Among the plurality of intermediate gears, the intermediate gear 39 becomes the final intermediate gear located on the output side of the drive transmission path.

According to the present embodiment, as shown in FIG. 2, the output shaft 41, the intermediate shaft 38, and the input shaft 32 are arranged in this order spaced in the vehicle front/rear direction. Further, the intermediate shaft 35 and the intermediate shaft 38 are arranged upper than the input shaft 32 and the output shaft 41. According to this embodiment, it is possible to arrange the intermediate shaft above the inner ring 12 to be a hub wheel, to secure a space for arranging the oil tank 47 below the inner ring 12, and to secure a space immediately under the inner ring 12. Therefore, it is possible to provide the steering axis extending in the vertical direction that intersects in a space immediately under the inner ring 12, so that the road wheel W and the in-wheel motor drive device 10 can suitably be steered around the steering axis.

Further, according to the present embodiment, as shown in FIG. 3, the input shaft 32 and the output shaft 41 extend in the vehicle width direction, and as shown in FIG. 2, the input gear 33 and the output gear 40 are set in an upright attitude in the vertical direction. A lower edge 40b of the output gear 40 is arranged further downward than a lower edge 33b of the input gear 33. As a result, the input gear 33 rotating at a high speed does not immerse in the lubricating oil stored in the lower part of the speed reduction portion 31 inside the main body casing 43, and the stirring resistance of the input gear 33 can be avoided.

Further, according to the present embodiment, as shown in FIG. 2, the plurality of intermediate shafts 35 and 38 include the first intermediate shaft 35, which is arranged above and next to the input shaft 32 and to which driving torque is supplied from the input shaft 32, and the final intermediate shaft 38, which is arranged above and next to the output shaft 41 and from which driving torque is supplied to the output shaft 41. The input shaft 32, the first intermediate shaft 35, the final intermediate shaft 38, and the output shaft 41 are arranged so that a reference line that serially connects the center (the axis M) of the input shaft, the center (the axis Nf) of the first intermediate shaft 35, the center (the axis NI) of the final intermediate shaft 38, and the center (the axis O) of the output shaft 41 draws an inverted U shape, as viewed in the axial direction of the plurality of intermediate shafts 35 and 38. As a result, the overall arrangement of the plurality of shafts and gears constituting the drive transmission path is downsized so that the plurality of shafts and gears can be housed inside the road wheel W.

As shown in FIG. 3, the main body casing 43 further houses a pump shaft 51, rolling bearings 52a and 52b, a pump gear 53, and an oil pump 54.

An axis P of the pump shaft 51 extends in parallel with the axis O of the output shaft 41. Further, the pump shaft 51 is arranged away in the vehicle front/rear direction from the output shaft 41, is supported rotatably via the rolling bearings 52a and 52b on both sides of the axis P direction, and is coupled coaxially with the pump gear 53 in the center portion of the axis P direction. The pump gear 53 is an externally toothed gear, is a helical gear, and is driven by the output gear 40 in engagement with the output gear 40.

The oil pump 54 is arranged in the other side of the axis P direction further than the rolling bearing 52b and is provided at the other end of the axis P direction of the pump shaft 51. The oil pump 54 is connected to a suction oil passage 59i and a discharge oil passage 59o shown in FIG. 2 (connection portion not shown). The suction oil passage 59i extends downward from the oil pump and reaches the oil tank 47, and a suction port 59j at the lower end of the suction oil passage 59i is arranged near the bottom wall of the oil tank 47. The discharge oil passage 59o extends upward from the oil pump, and a discharge port 59p at the upper end of the discharge oil passage 59o is arranged at a position higher than the intermediate gear 37.

As the oil pump 54 is driven by the output gear 40, the oil pump 54 sucks the lubricating oil of the oil tank 47 through the suction port 59j, and discharges the sucked lubricating oil through the discharge port 59p. The discharge port 59p is located higher than all the gears (the input gear 33, the intermediate gears 34, 36, 37, and 39, and the output gear 40), and supplies lubricating oil to these gears from above. Further, the lubricating oil is injected from the discharge oil passage 59o into the inside of the motor portion 21. As a result, the motor portion 21 and the speed reduction portion 31 are lubricated and cooled.

With reference to FIG. 2, the pump shaft 51 of the present embodiment is arranged downward of the input shaft 32, and the oil tank 47 is arranged downward of the pump shaft 51. The oil pump 54 is arranged substantially coaxially with the pump shaft 51, and pumps up the lubricating oil stored in the oil tank 47 to immediate upward of the oil tank 47. The pump shaft 51 and the oil tank 47 are arranged in the vehicle ahead of the output shaft 41. When the road wheel W is driven by the in-wheel motor drive device 10 and the electric vehicle travels, the oil tank 47 receives the traveling wind from the front of the vehicle and is air-cooled.

Next, the suspending bracket of the in-wheel motor drive device will be described.

Figure 5:
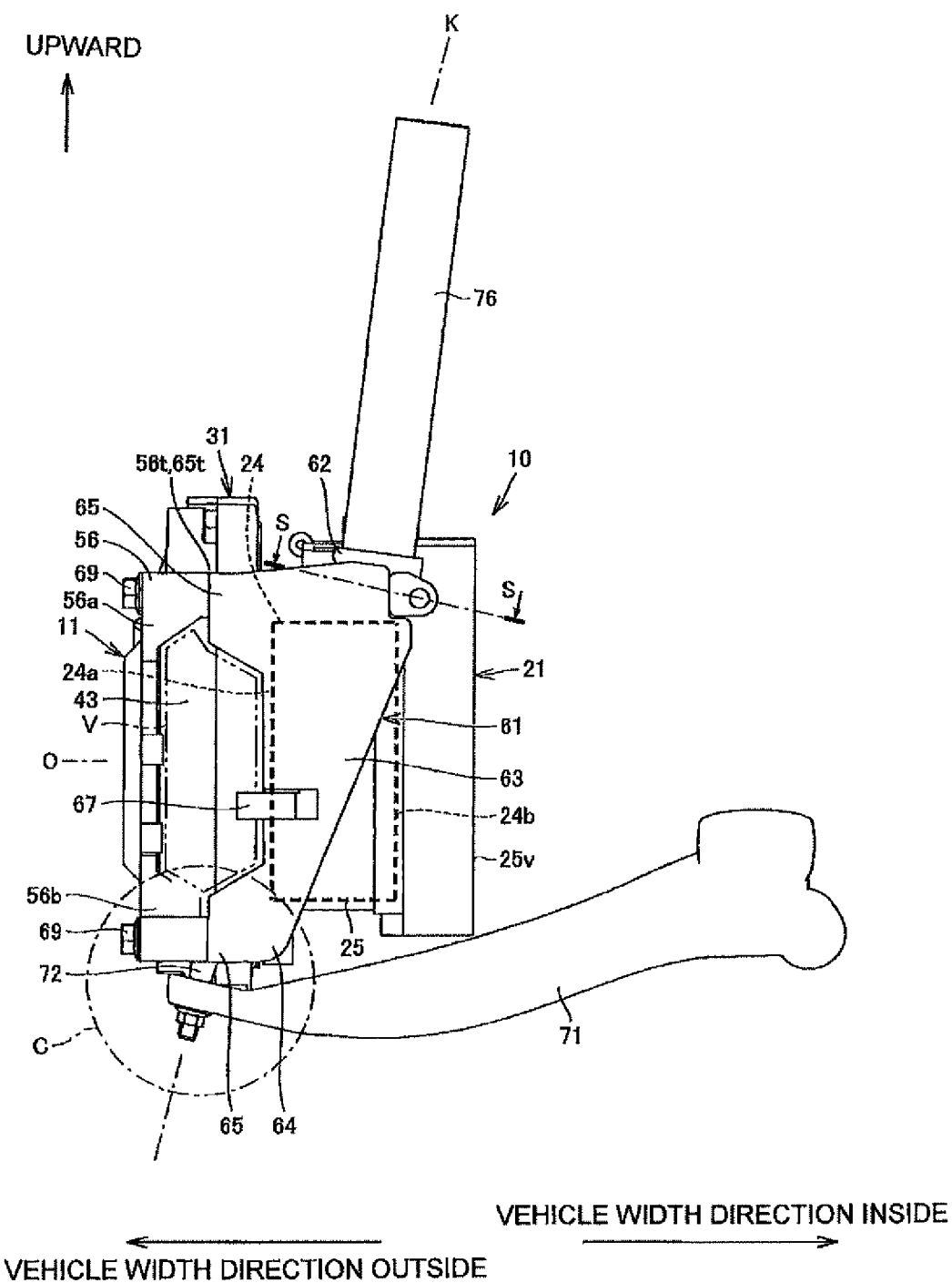
FIG. 5 is a side view showing the first embodiment.
Figure 6A:
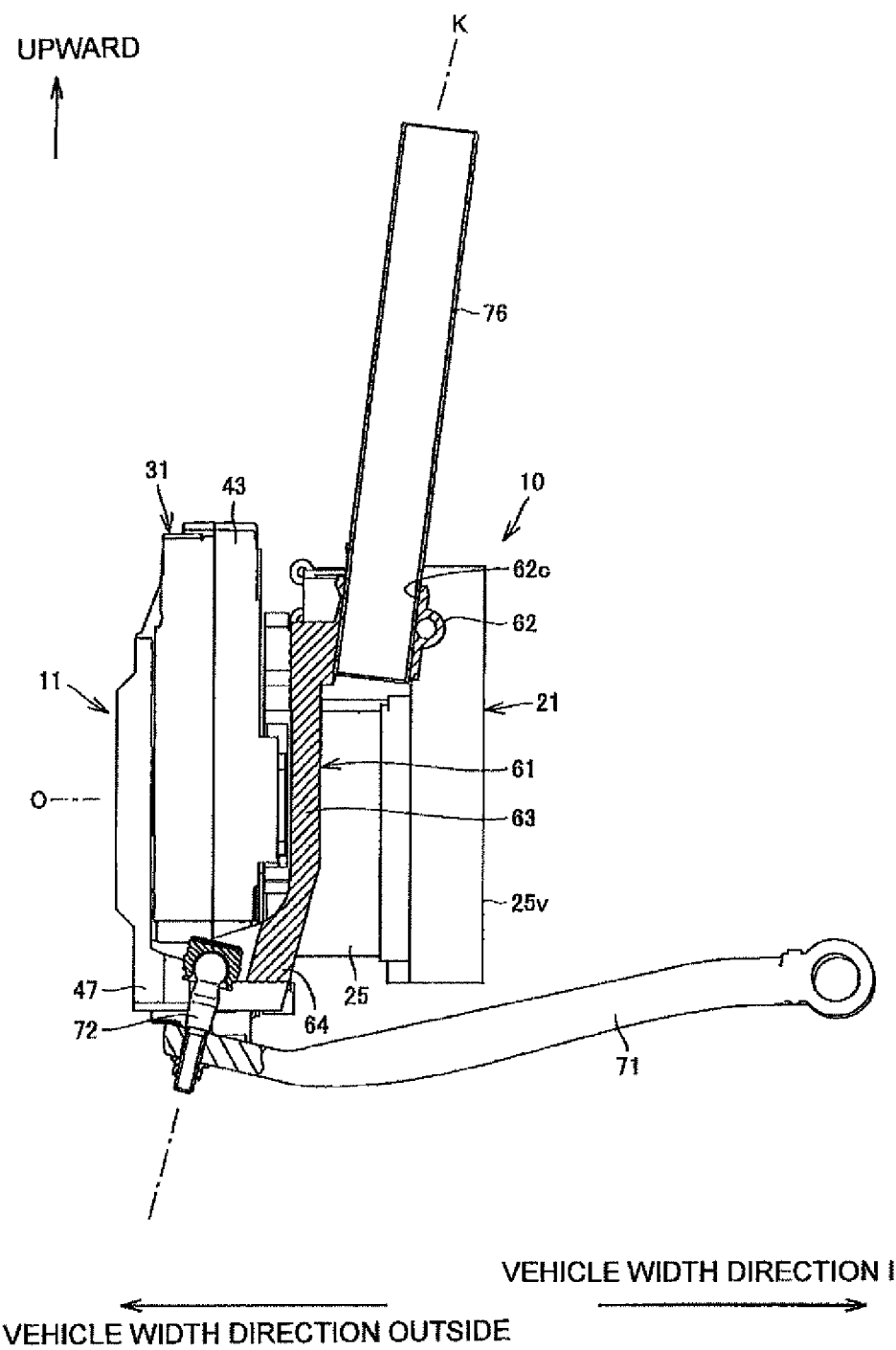
FIG. 6A is a sectional view showing the first embodiment.
Figure 6B:
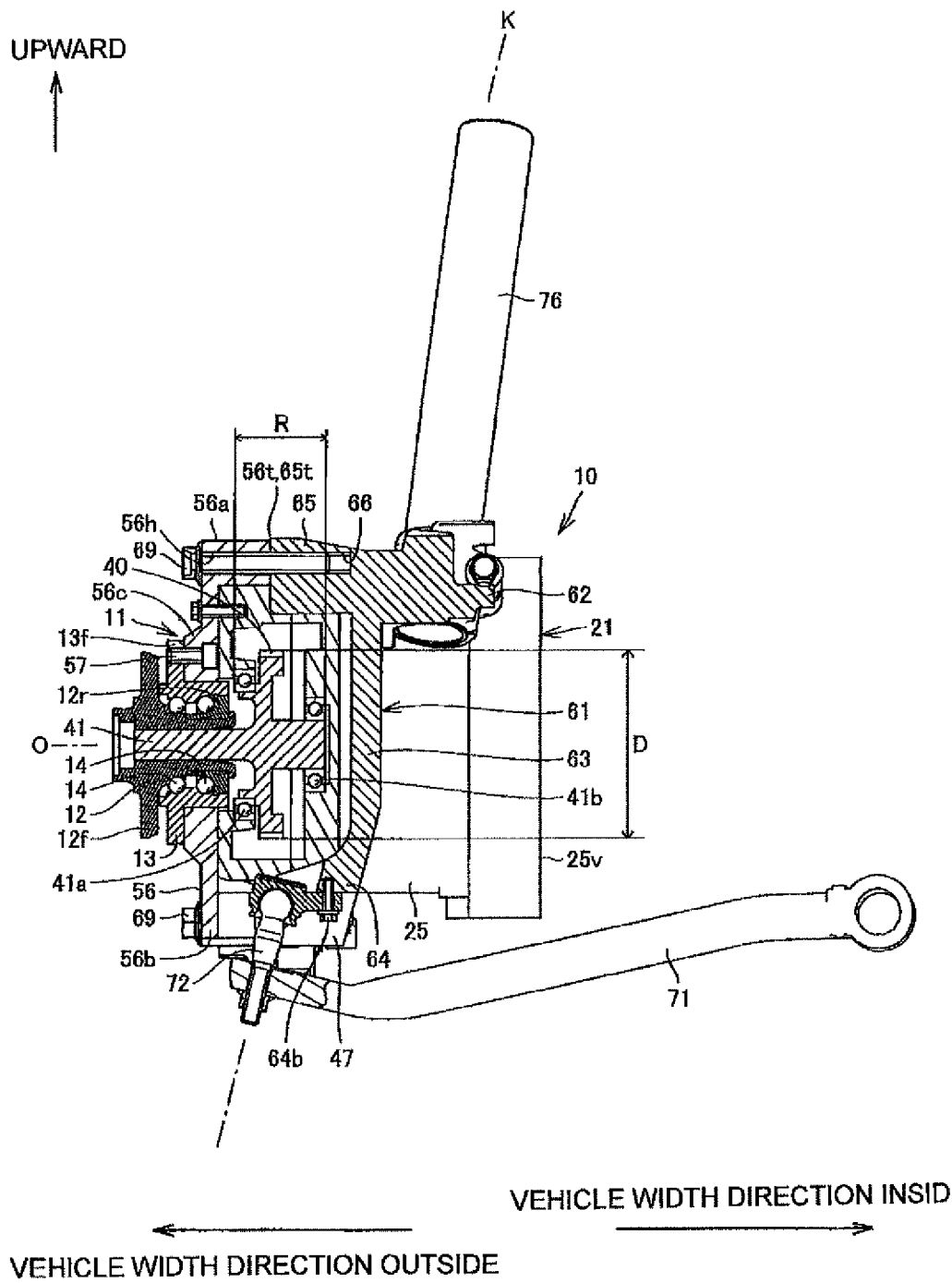
FIG. 6B is a sectional view showing the first embodiment.

FIG. 4A is a front view showing the in-wheel motor drive device according to the first embodiment of the present invention together with the suspension device, and shows a state of being viewed from the vehicle width direction outside. FIG. 5 is a side view showing the first embodiment together with the suspension device of, and shows a state of being viewed from behind of the vehicle. FIG. 6A is a sectional view showing the suspending bracket of the first embodiment, and shows a state in which the suspending bracket is cut along the one plane indicated by A-A in FIG. 4A and the cut section is viewed in the direction of the arrow. FIG. 6B is a sectional view showing the in-wheel motor drive device of the first embodiment, and shows a state in which the in-wheel motor drive device is cut along the two planes indicated by B-B in FIG. 4A and the cut section is viewed in the direction of the arrow.

Figure 7B:
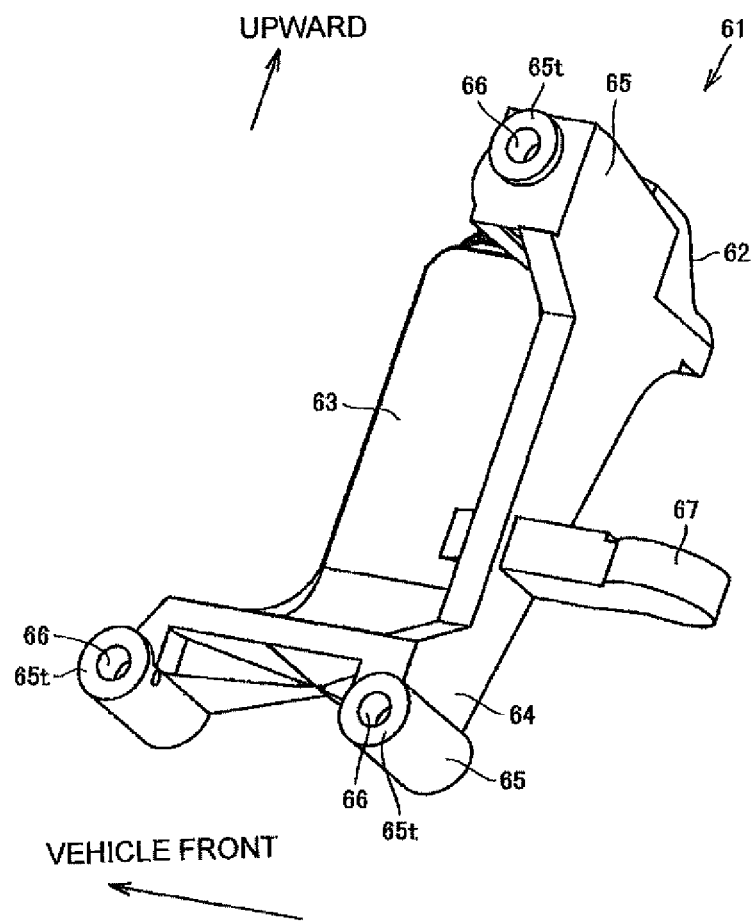
FIG. 7B is a perspective view showing a suspending bracket taken out from the first embodiment.

FIG. 7A and FIG. 7B are perspective views showing the suspending bracket taken out from the first embodiment. FIG. 7A mainly shows the vehicle width direction inside, and FIG. 7B mainly shows the vehicle width direction outside.

As shown in FIG. 4A and FIG. 5, the suspending bracket 61 is attached to the main body casing 43 of the present embodiment. Regarding the axis O direction position, the wheel hub bearing portion 11, the speed reduction portion 31, and the suspending bracket 61 are arranged in this order. The axis O direction position of the suspending bracket 61 overlaps with the axis O direction position of the motor portion 21. Regarding the vehicle front/rear direction position, the motor section 21 and the speed reduction unit 31 are arranged ahead, and the wheel hub bearing unit 11 and the suspending bracket 61 are arranged behind.

As shown in FIG. 5, the suspending bracket 61 is a single member including an upper joining seat portion 62, an intermediate portion 63, a lower joining seat portion 64, and a protruding portion 65. The upper joining seat portion 62 is provided at the upper end portion of the suspending bracket 61, and is joined with the lower end of the upper side suspension member, for example, a strut 76. The strut 76 constitutes an upper side suspension member of the strut type suspension device, and is a shock absorber including a damper extending in the vertical direction and a coil spring attached to the damper. It is to be noted that in each of the figures, only the damper external cylinder of the strut 76 is shown, and the damper inner cylinder, the coil spring, the coil spring seat, and the like are not illustrated. In addition, the upper side suspension member may be composed of an upper arm or a plurality of links as another embodiment.

The lower joining seat portion 64 is provided at the lower end portion of the suspending bracket 61, and is joined with a vehicle width direction outside end of a lower side suspension member, for example, a lower arm 71. The lower arm 71 is an arm constituting the lower side suspension member of the strut type suspension device. The lower arm 71 extends in the vehicle width direction and is rotatably joined to a vehicle body side member such as a subframe at the vehicle width direction inside end. The lower arm 71 can swing in the vertical direction with the vehicle width direction inside end as a base end and the vehicle width direction outside end as a free end. In addition, the lower side suspension member may be composed of a plurality of links as another embodiment.

The intermediate portion 63 occupies the vertical direction center region of the suspending bracket 61 and connects the upper joining seat portion 62 and the lower joining seat portion 64. The plurality of protruding portions 65 are provided, and there are the protruding portion 65 protruding horizontally from the upper joining seat portion 62 to the vehicle width direction outside and the protruding portion 65 protruding horizontally from the lower joining seat portion 64 to the vehicle width direction outside.

In the first embodiment, one protruding portion 65 is formed on the upper side. In addition, two protruding portions 65 are formed on the lower side spaced in the vehicle front/rear direction. The upper joining seat portion 62, the intermediate portion 63, the lower joining seat portion 64, and the protruding portion 65 are integrally formed.

As shown in FIG. 6B, each of the protruding portions 65 comes into contact with the hub attachment 56. Specifically, an end surface 65t of the protruding portion 65 of the upper side comes into contact with a butting surface 56t formed so as to protrude to the vehicle width direction inside from the upper side portion 56a of the hub attachment 56. Also, the end surface 65t of the protruding portion 65 of the lower side comes into contact with the abutting surface 56t of the lower side portion 56b (FIG. 4A) of the hub attachment 56. In this manner, the end surface of each of the protruding portions 65 comes into contact with the other surface in the axis O direction of the hub attachment 56 in a position where it does not interfere with the main body casing 43.

A female screw hole 66 is formed in each of the protruding portions 65. Each of the female screw holes 66 is pierced on the end surface 65t and extends in parallel with the axis O. A plurality of through holes 56h of round holes are formed in positions corresponding to the female screw holes 66 of the hub attachment 56. Each of the through holes 56h is pierced on the butting surface 56t and extends in parallel with the axis O. Three butting surfaces 56t are provided so as to be separated from one another but are all flush with one another. The same is true for each of the end surfaces 65t. The butting surface 56t and the end surface 65t are arranged between rolling bearings 41a and 41b, which are separated in the axis O direction.

As shown in FIG. 5, the intermediate portion 63 of the suspending bracket 61 overlaps with a steering axis K as viewed in the vehicle front/rear direction Here, the vehicle front/rear direction is orthogonal to the axis O. The intermediate portion 63 also shown in FIG. 7A and FIG. 7B intersects with the steering axis K. Further, the suspending bracket 61 intersects with the axis O. The female screw hole 66 of the lower side and the end surface 65t are provided in the vehicle ahead and behind of the steering axis K, respectively.

In FIG. 5, the stator core of the stator 24 is indicated by a broken line. The stator core is a laminated steel plate stacked in the axial direction of the motor portion 21. One end surface 24a in the axial direction of the stator core is oriented to the vehicle width direction outside (outboard side), and the other end surface 24b in the axial direction of the stator core is directed to the vehicle width direction inside (inboard side).

As shown in FIG. 5, the suspending bracket 61 overlaps with the stator 24 as viewed in the vehicle front/rear direction. In other words, the axis O direction position of the suspending bracket 61 overlaps with the axis O direction position of the stator 24. The upper joining seat portion 62 protrudes further upward than the stator 24, and the lower joining seat portion 64 protrudes further downward than the stator 24.

As shown in FIG. 6B, the vertical direction dimension of the suspending bracket 61 is larger than a diameter D of the addendum circle of the output gear 40. The upper joining seat portion 62 protrudes further upward than the output gear 40, and the lower joining seat portion 64 protrudes further downward than the output gear 40.

The female screw hole 66 and the through hole 56h coincide with each other, and the bolt 69 is inserted through each of the through holes 56h of the hub attachment 56 from one side in the axis O direction. Each of the bolts 69 penetrates the through hole 56h of one side of the axis O direction and is screwed with the female screw hole 66 of the other side of the axis O direction. By tightening each of the bolts 69 as a fixing means, the hub attachment 56 and the suspending bracket 61 are joined and fixed. In the present embodiment, three bolts 69, three through holes 56h receiving the bolts 69, and three female screw holes 66 screwed with the bolts 69 are provided as fixing means. However, the bolts 69 and the like are not limited to a predetermined number, and a plurality of them may be provided around the outer ring 13.

In addition, regarding the output shaft 41 with reference to FIG. 6B, the both end portions of the output shaft 41 are rotatably supported by the rolling bearings 41a and 41b, respectively. The rolling bearings 41a and 41b are arranged so as to sandwich the output gear 40 therebetween. The rolling bearing 41a on the vehicle width direction outside is mounted to the front surface portion 43f. The rolling bearing 41b on the vehicle width direction inside is mounted to the back surface portion 43b. The butting surface 56t and the end surface 65t are arranged in a range R from the axis O direction position of the rolling bearing 41a to the axis O direction position of the rolling bearing 41b. It is to be noted that the range R may include the axis O direction dimension of the rolling bearings 41a and 41b themselves.

As shown in FIG. 5, the protruding portion 65 of the upper side is supported by the upper joining seat portion 62 in a cantilever manner. The protruding portion 65 of the lower side is supported by the lower joining seat portion 64 in a cantilever manner. A protruding portion including the butting surface 56t is formed also in the hub attachment 56 at a position corresponding to each of the protruding portions 65. The protruding portion is also supported by the hub attachment 56 in a cantilever manner. As a result, the hub attachment 56 and the suspending bracket 61 define an opening V, which is opened in the vehicle front/rear direction. The main body casing 43 is exposed from the opening V.

Figure 4B:
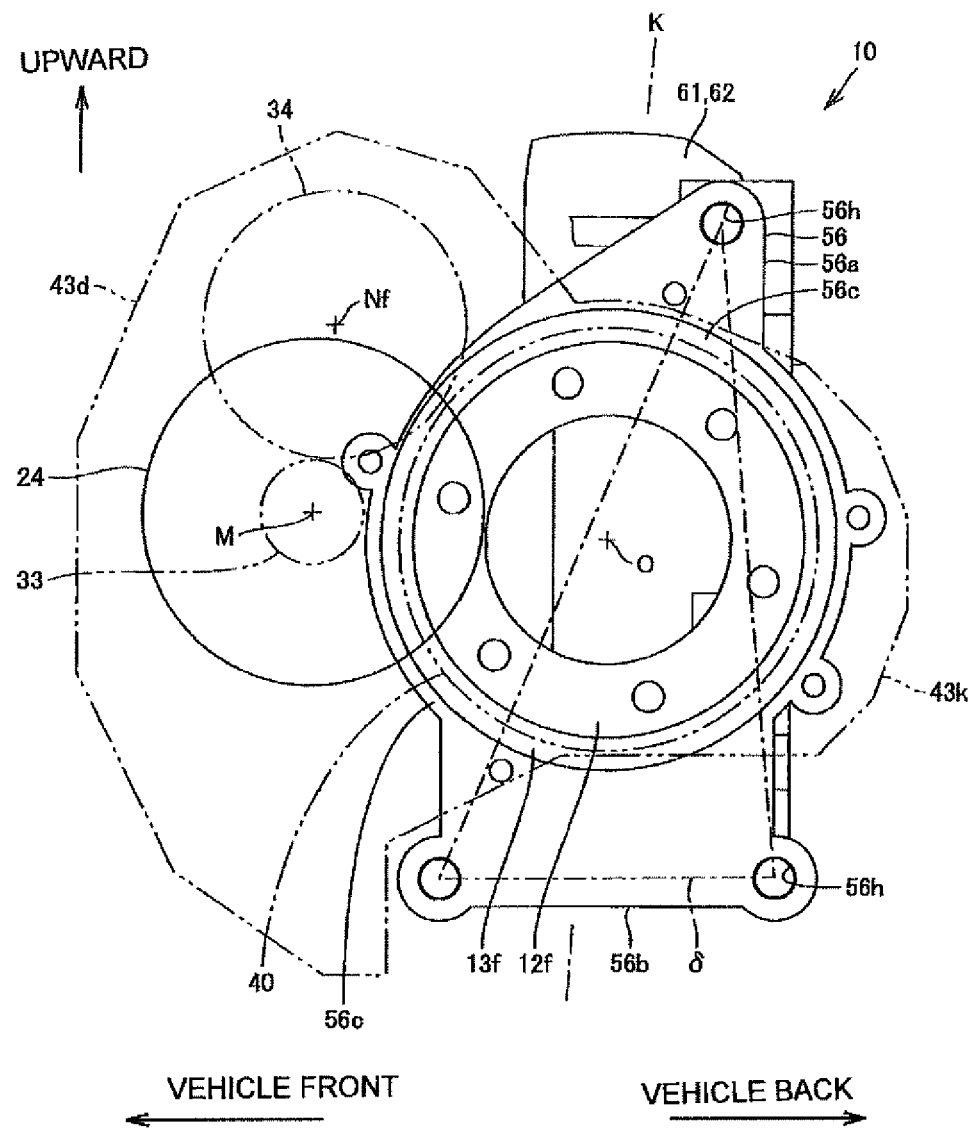
FIG. 4B is a front view schematically showing a variation of the first embodiment.

FIG. 4B is a schematic view showing a variation of the in-wheel motor drive device, and shows the positional relationship between the rotating element of the in-wheel motor drive device and the suspending bracket as viewed in the axis O direction. The through holes 56 pierced in the hub attachment 56 coincides with the female screw holes 66 pierced in the suspending bracket 61. As viewed in the axis O direction, the hub attachment 56, the output gear 40 of the disk, and the suspending bracket 61 overlap with one another.

The centers of the through holes 56h make a triangle S when connected by a straight line. The main body casing 43 includes a region 43d of the vehicle ahead of the triangle δ and a region 43k of the vehicle behind of the triangle δ. It is to be noted that the region 43k supports a motor portion (not shown) on the vehicle width direction inside. As a variation not shown, four or more through holes 56h may be provided, and the main body casing 43 may protrude forward of the vehicle and rearward of the vehicle as viewed from a polygon in which adjacent through holes 56h are connected with each other by a straight line.

Figure 8:
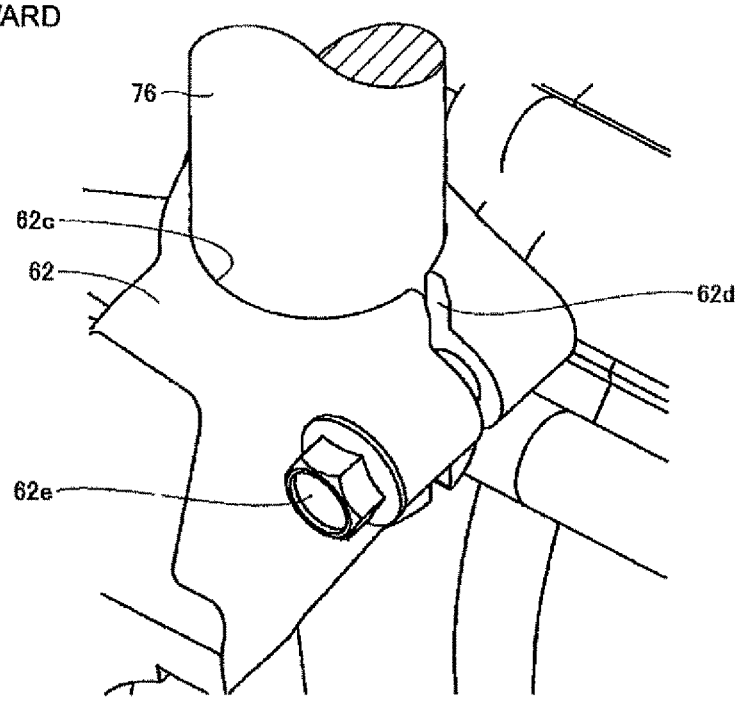
FIG. 8 is a perspective view showing an upper portion of the suspending bracket in an enlarged manner.
Figure 9:
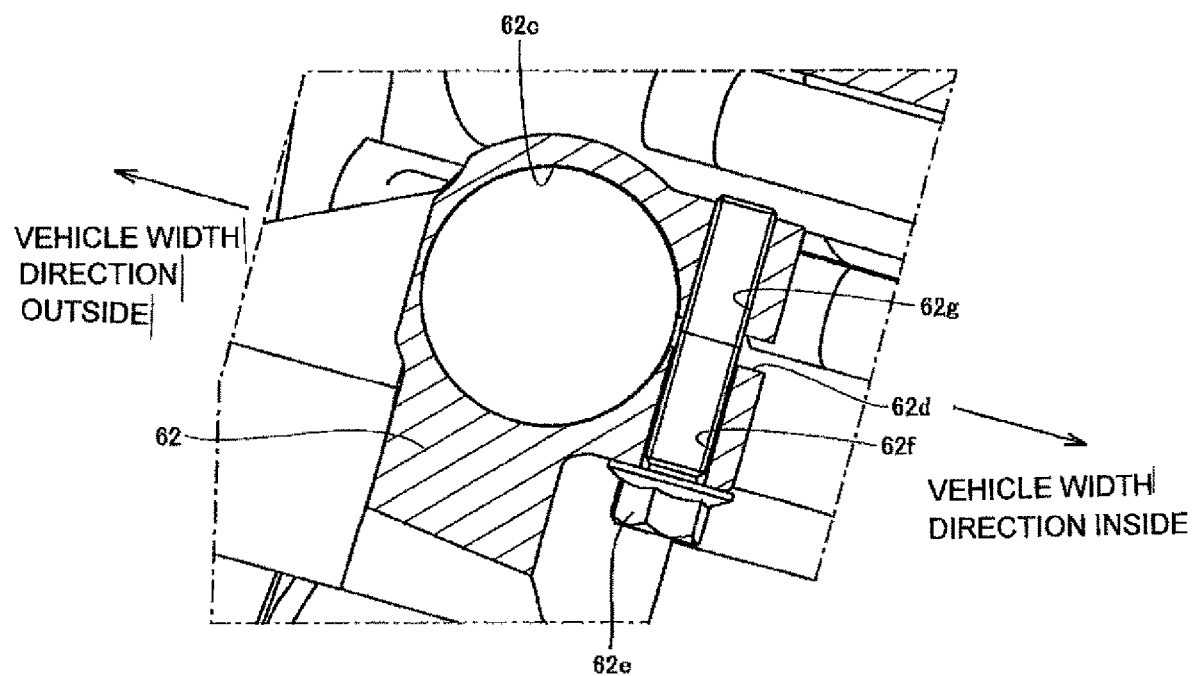
FIG. 9 is a sectional view showing the upper portion of the suspending bracket.

FIG. 8 is a perspective view showing an upper portion of the suspending bracket in an enlarged manner. FIG. 9 is a sectional view showing the upper portion of the suspending bracket, and shows a state of being cut along the plane indicated by S-S in FIG. 5 and the cut section is viewed in the direction of the arrow. It is to be noted that the strut is not illustrated in FIG. 11 in order to avoid complication. The upper joining seat portion 62 of the suspending bracket 61 has a through hole 62c having a circular cross section and opening upward. The cylindrical wall portion defining the through hole 62c is formed in a substantially C-shaped cross section with a slit (gap) 62d opening in the circumferential direction. Further, a through hole 62f and a female screw hole 62g through which a bolt 62e passes are formed in the upper joining seat portion 62 so as to extend in one row via the slit 62d.

By passing the strut 76 through the through hole 62c and tightening the bolt 62e, the slit 62d becomes narrow, and the strut 76 is firmly joined and fixed to the upper joining seat portion 62.

Figure 10:
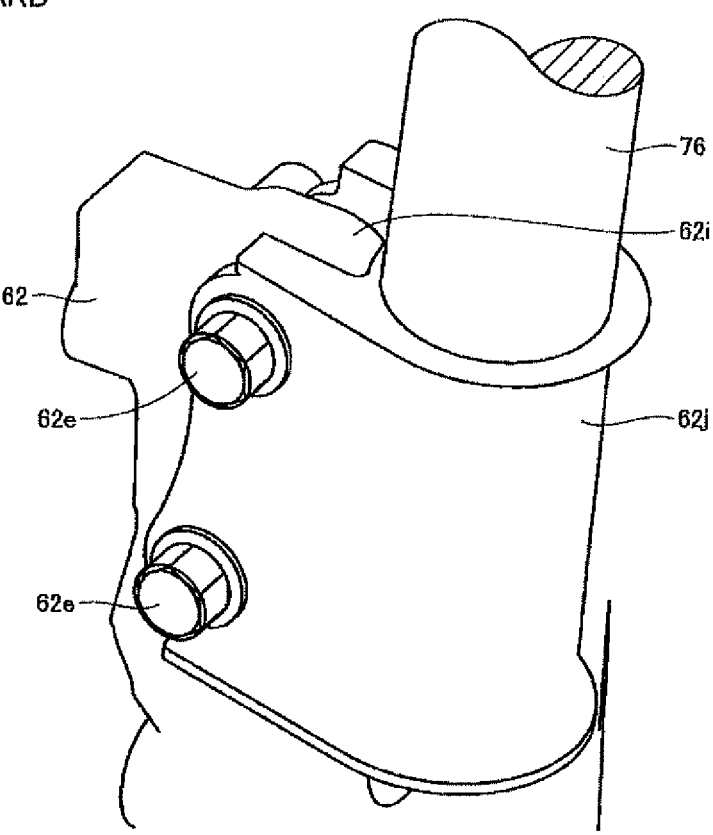
FIG. 10 is a perspective view showing a variation of the upper portion of the suspending bracket.
Figure 11:
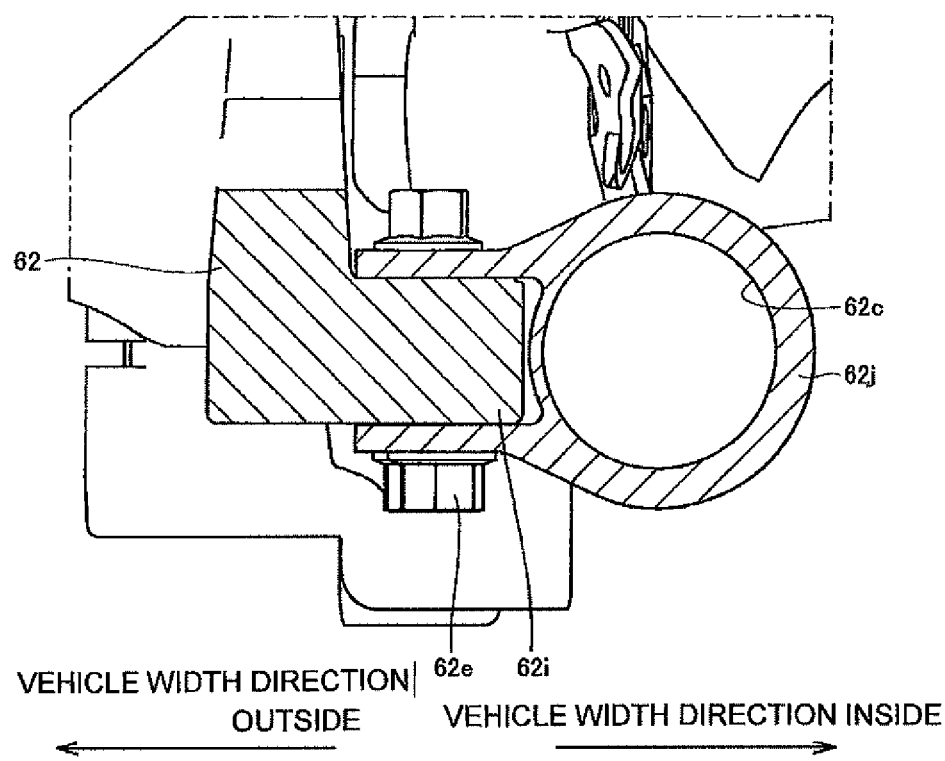
FIG. 11 is a sectional view showing a variation of FIG. 10.

In the embodiment shown in FIG. 8, FIG. 9, and the like, the upper joining seat portion 62 is a single member, and a joining tool (bolt 62e) is attached. Alternatively, as a variation of the embodiment shown in FIG. 8, FIG. 9, and the like, the upper joining seat portion 62 may be formed of two members and a joining tool may be additionally attached. FIG. 10 is a perspective view showing a variation of the upper portion of the suspending bracket. FIG. 11 is a sectional view showing a variation of FIG. 10.

The upper joining seat portion 62 of the variation includes a plate-shaped base portion 61i and a joining member 62j having a C-shaped cross section. The base portion 61i is inserted in a circumferential gap of the joining member 62j. Similarly to the above-described through hole 62f and the female screw hole 62g, a through hole and a female screw hole through which the bolt 62e passes are formed in the joining member 62j so as to extend in one row via a circumferential gap. A through hole through which the bolt 62e passes is formed also in the base portion 61i.

The strut 76 is firmly joined and fixed to the upper joining seat portion 62 by passing the strut 76 through the center hole of the joining member 62j and tightening the bolt 62e.

Figure 12:
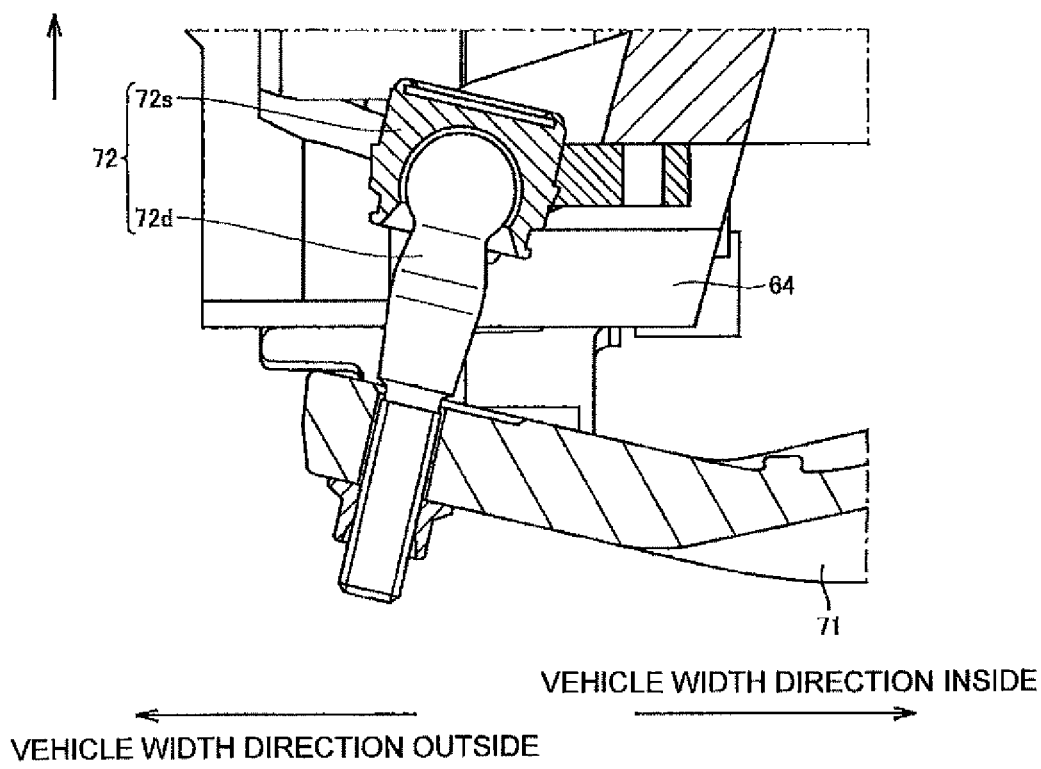
FIG. 12 is a sectional view showing a lower portion of the suspending bracket.
Figure 13:
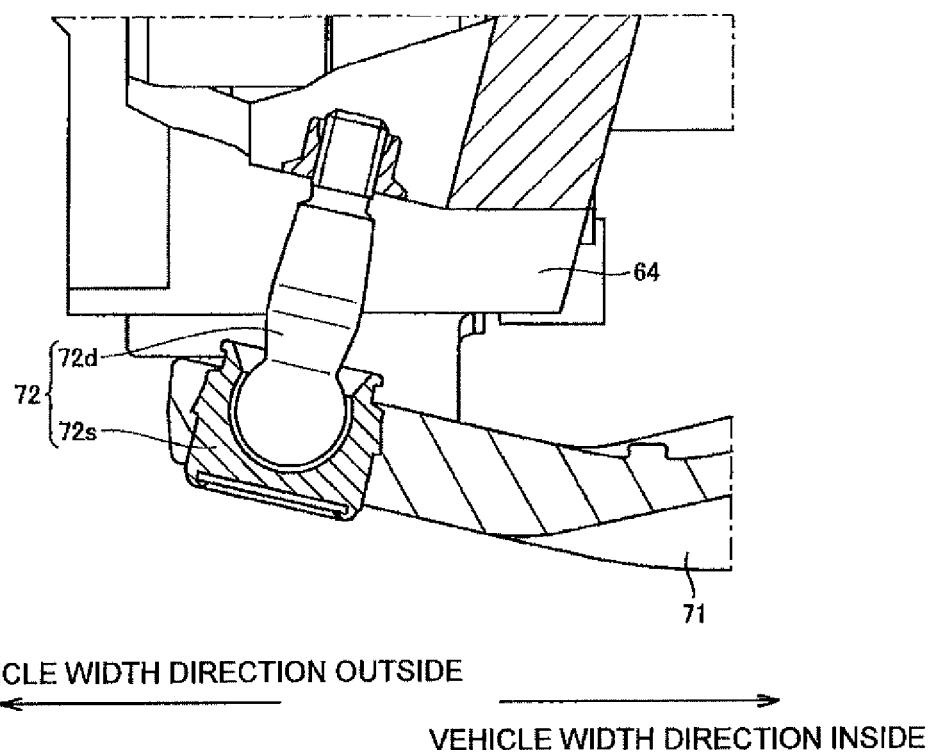
FIG. 13 is a sectional view showing a variation of the lower portion of the suspending bracket.

FIG. 12 is a sectional view showing a lower portion of the suspending bracket, in which an encircled portion C indicated by a one-dot chain line in FIG. 5 is enlarged. Returning to the explanation of the first embodiment, a socket 72s of a ball joint 72 is mounted to the lower joining seat portion 64 of the suspending bracket 61 by a bolt 64b. The socket 72s is a downward opening. A ball stud 72d of the ball joint 72 is erected on the lower arm 71. The lower end of the ball stud 72d is nut-fixed to the vehicle width direction outside end of the lower arm 71, and the upper end thereof has a ball portion. The ball portion of the ball stud 72d is slidably housed in the socket 72s. As a result, the ball stud 72d is freely joined to the socket 72s. FIG. 13 is a sectional view showing a variation of the lower portion of the suspending bracket. The difference from FIG. 12 is that the ball joint 72 is provided upside down.

The suspending bracket 61 further includes a tie rod arm 67. The tie rod arm 67 is arranged at the rear portion of the intermediate portion 63 and integrally formed with the intermediate portion 63. When the suspending bracket 61 is mounted and fixed to the vehicle width direction inside portion of the in-wheel motor drive device 10, the tie rod arm 67 extends rearward of the vehicle as shown in FIG. 4A. At the end of the tie rod arm 67, a tie rod joining seat portion, such as a round hole for receiving the ball joint, is formed. A tie rod (not shown) is joined to the tie rod joining seat portion at the end of the tie rod arm 67.

When the tie rod is pushed and pulled in the vehicle width direction by a steering device (not shown), the in-wheel motor drive device 10 including the suspending bracket 61 is steered together with the wheels. The steering axis K, which is the center of steering, is a straight line passing through the upper end of the strut 76 and the ball joint 72 and extending in the vertical direction as shown in FIG. 4A.

The main body casing 43 is made of a light metal and is a casting containing, for example, aluminum as a principal component. Further, the suspending bracket 61 and the hub attachment 56 are made of steel and are greater than the main body casing 43 in rigidity. In the present embodiment, the bolt 69, the through hole 56h of a round hole, and the female screw hole 66 are provided as fixing means. According to the present embodiment, members for mounting the in-wheel motor drive device to the suspension device are concentrated in the suspending bracket 61. The suspending bracket 61 is mounted and fixed to the hub attachment 56 of the wheel hub bearing portion 11. As a result, even if an excessive external force is applied from the wheel side to the wheel hub bearing portion 11, the suspending bracket 61 can receive the excessive external force and release it to the suspension device. Therefore, the excessive external force is not transmitted to the main body casing 43 of the speed reduction portion 31, and it is possible to protect the speed reduction portion 31 so as not to cause undesirable deformation in the speed reduction portion 31.

Figure 14:
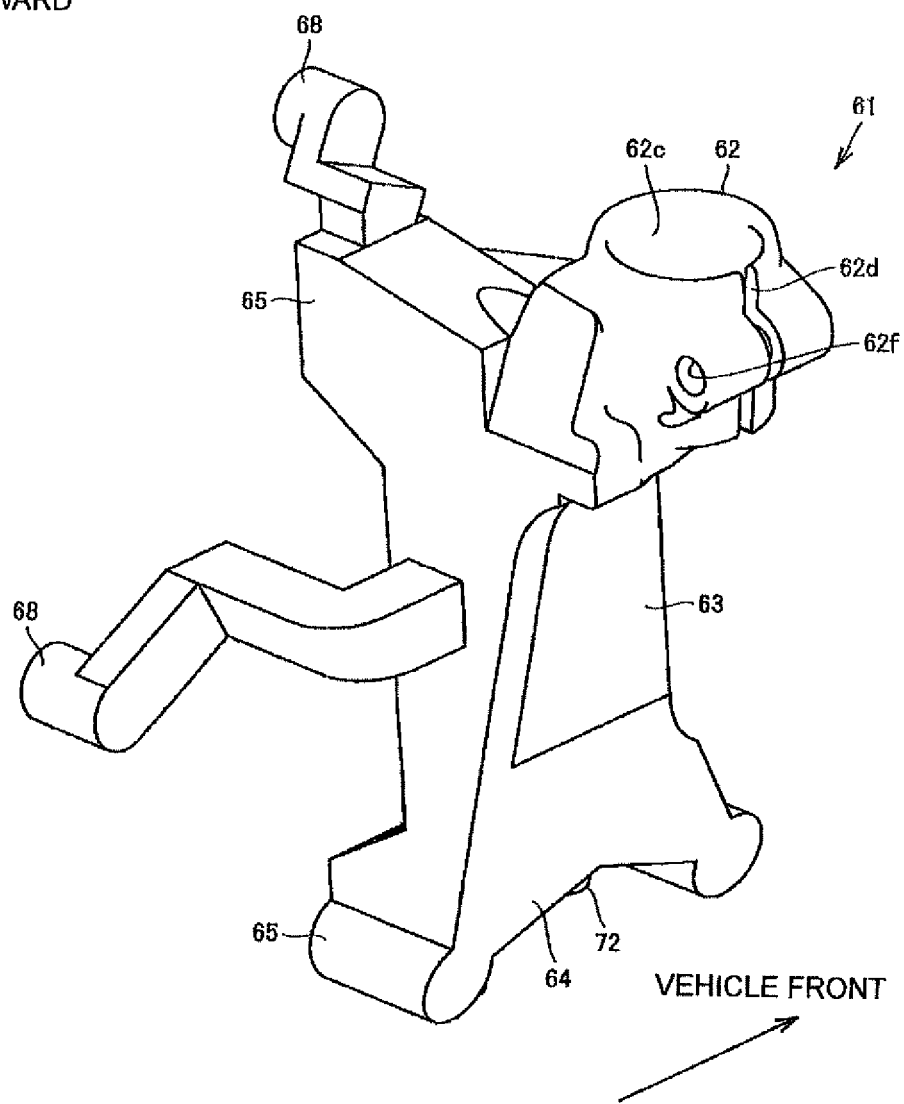
FIG. 14 is a perspective view showing the suspending bracket of a first variation.

Next, the suspending bracket of a first variation will be described. FIG. 14 is a perspective view showing the suspending bracket of the first variation. With respect to this variation, the identical reference numerals are given to the configurations common to the above-described embodiments, the description thereof will be omitted, and different configurations will be described below. In the suspending bracket 61 of the first variation, the tie rod arm is omitted. Instead, the tie rod arm is integrally formed with, for example, the main body casing 43.

The suspending bracket 61 of the first variation further includes two brake caliper arms 68. One of the brake caliper arms 68 is formed integrally to the intermediate portion 63 of the suspending bracket 61 and the other of the brake caliper arms 68 is formed integrally to the upper joining seat portion 62. As shown in FIG. 4A, when the suspending bracket 61 is mounted and fixed to the vehicle width direction inside portion of the in-wheel motor drive device 10, one of the brake caliper arms 68 extends rearward of the vehicle and the other brake caliper arm 68 extends upward.

At the end of each of the brake caliper arms 68, a brake caliper joining seat portion, such as a female screw hole (not shown) for receiving a bolt, is formed. A brake caliper (not shown) is joined to the brake caliper joining seat portion at the end of each of the brake caliper arms 68, and the two brake caliper arms 68 support the brake caliper at the both sides. The brake caliper is arranged along the outer edge of the brake disc BD (FIG. 3) and puts a brake on the wheel (road wheel W) by clamping the brake disc BD. The brake caliper may be driven by hydraulic pressure or may be driven by an electric actuator, and thus the mechanism is not particularly limited. As a variation not shown, the suspending bracket 61 may include the tie rod arm 67 and the brake caliper arm 68.

Next, a suspending bracket of a second embodiment will be described.

Figure 15:
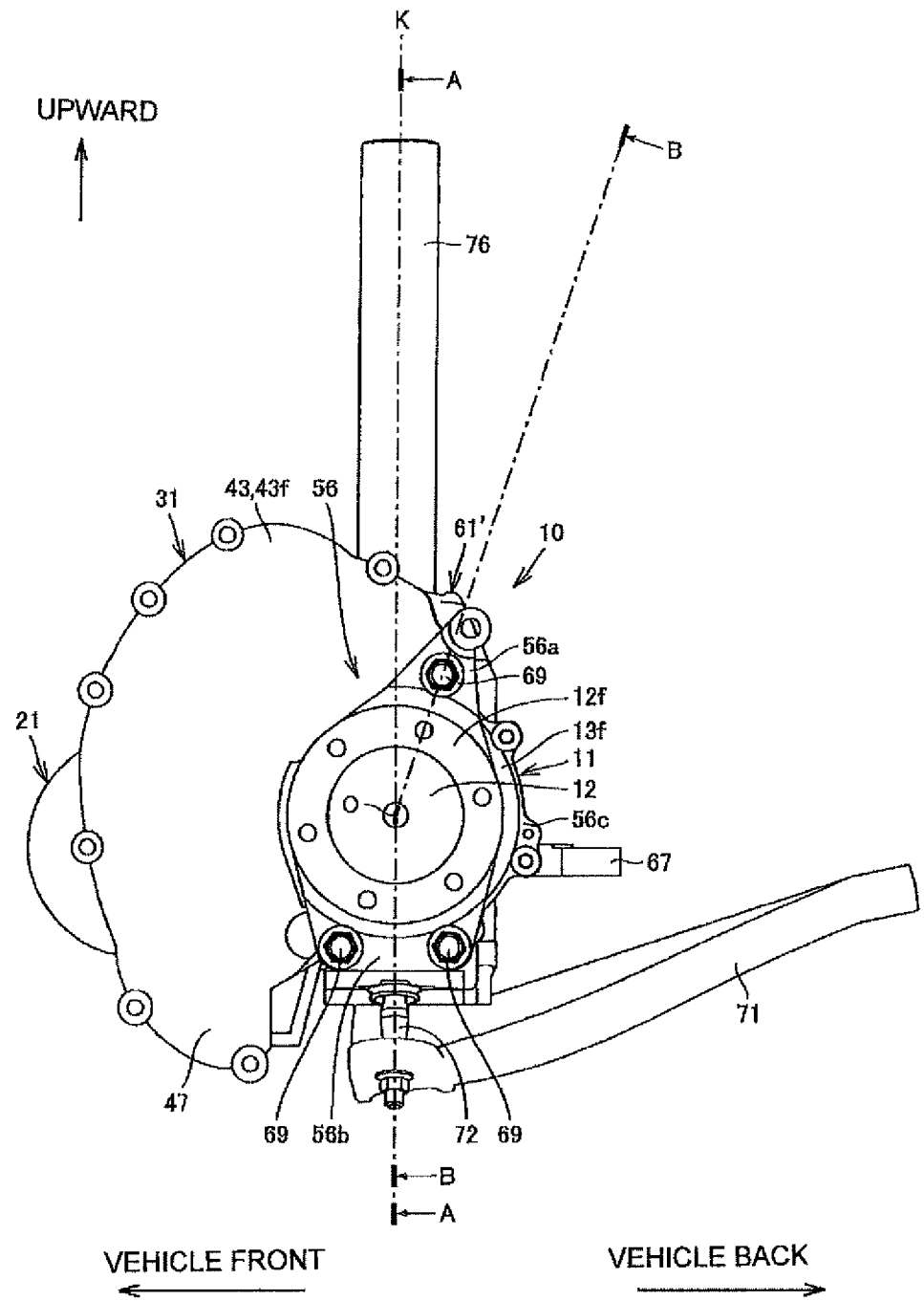
FIG. 15 is a front view showing an in-wheel motor drive device according to a second embodiment of the present invention together with a suspension device.
Figure 16:
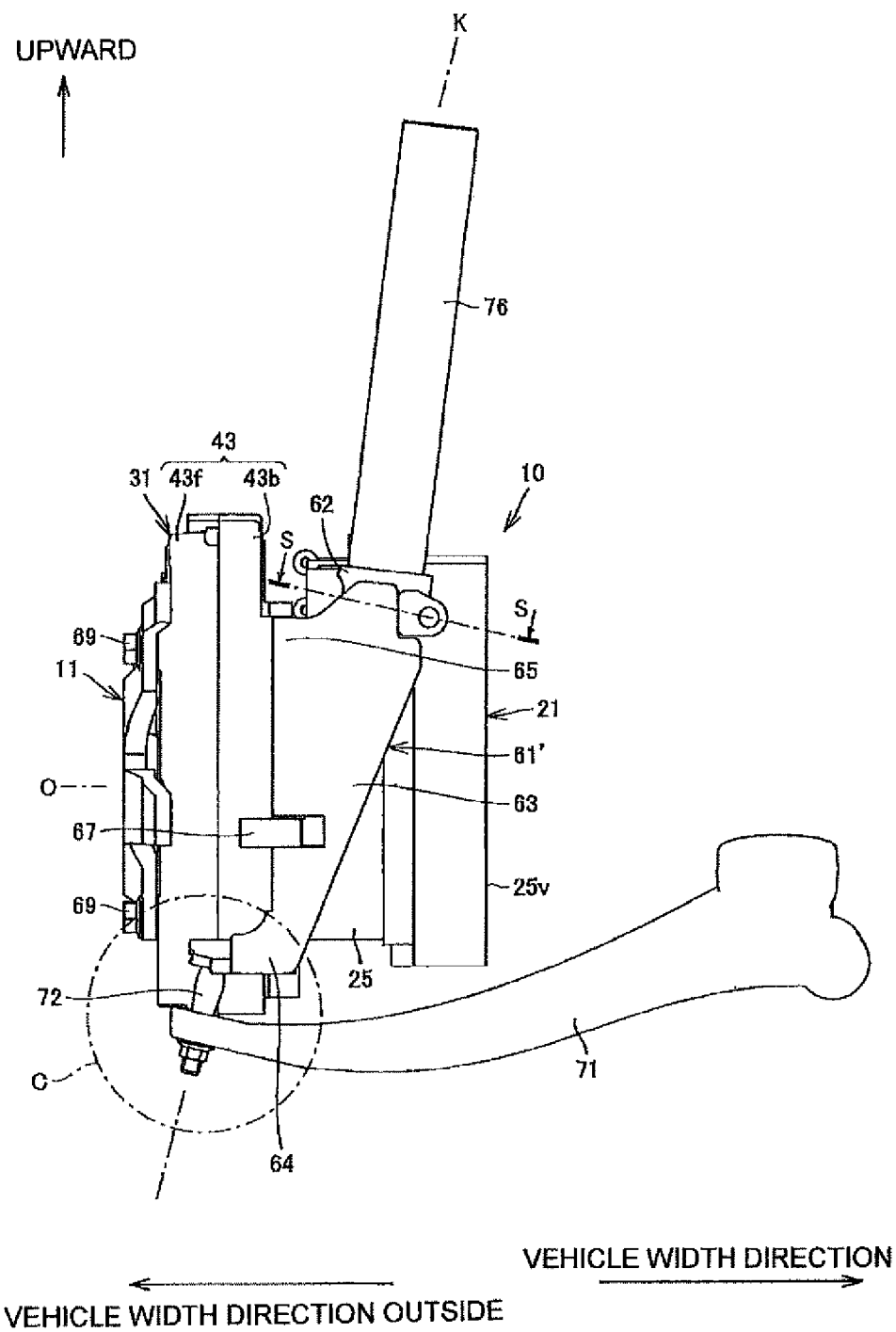
FIG. 16 is a side view showing the second embodiment.
Figure 17A:
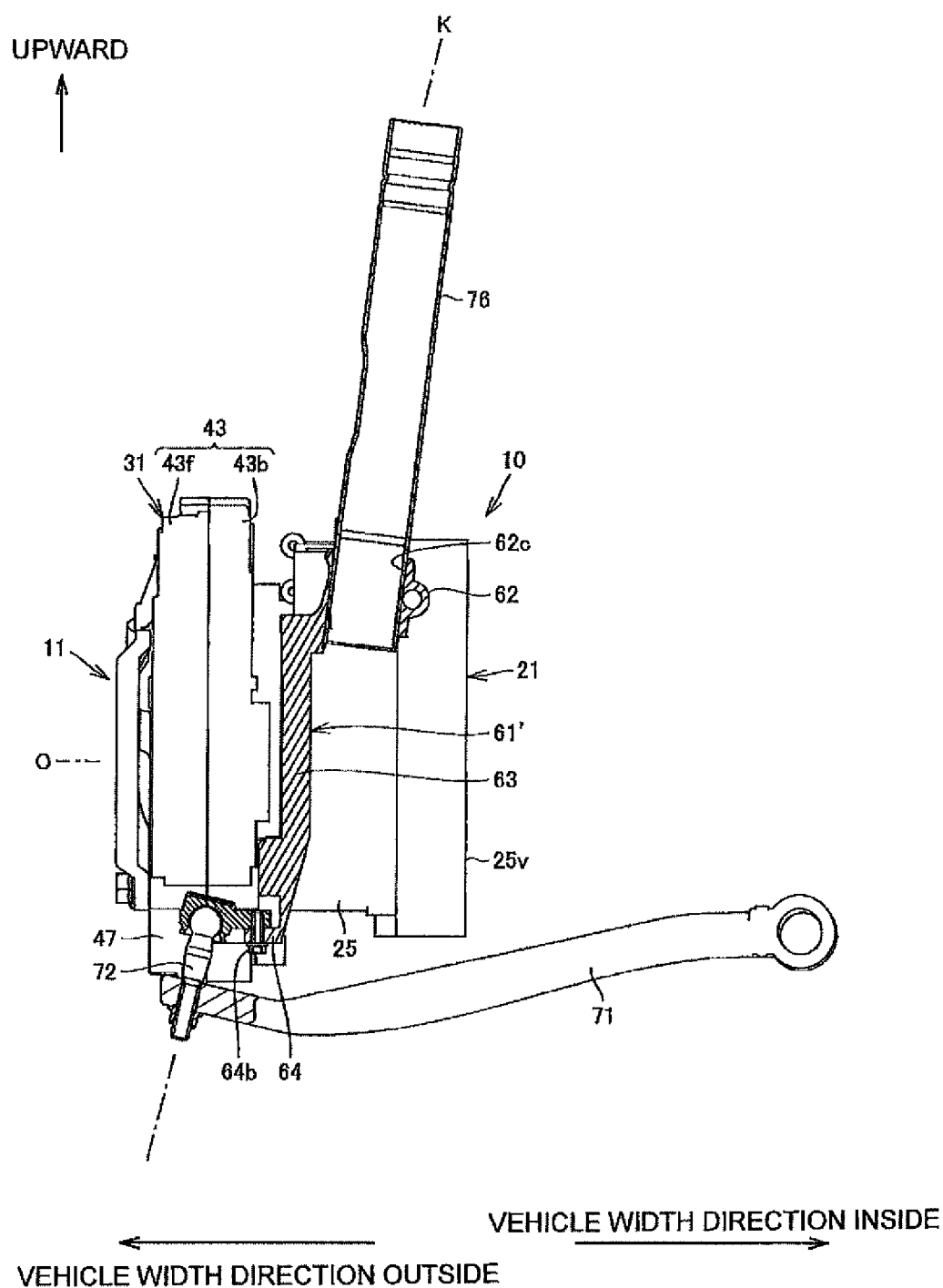
FIG. 17A is a sectional view showing the second embodiment.
Figure 17B:
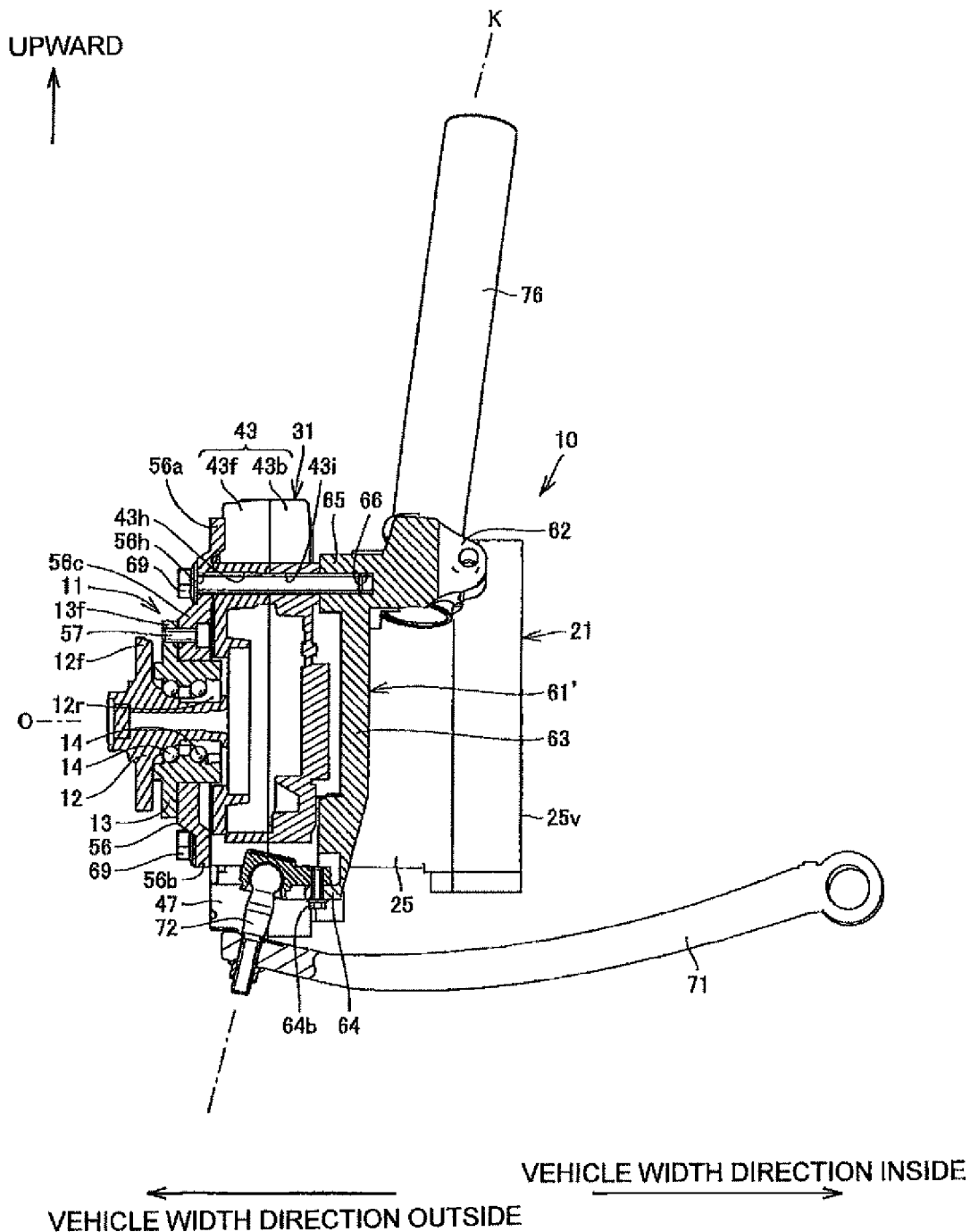
FIG. 17B is a sectional view showing the second embodiment.
Figure 18:
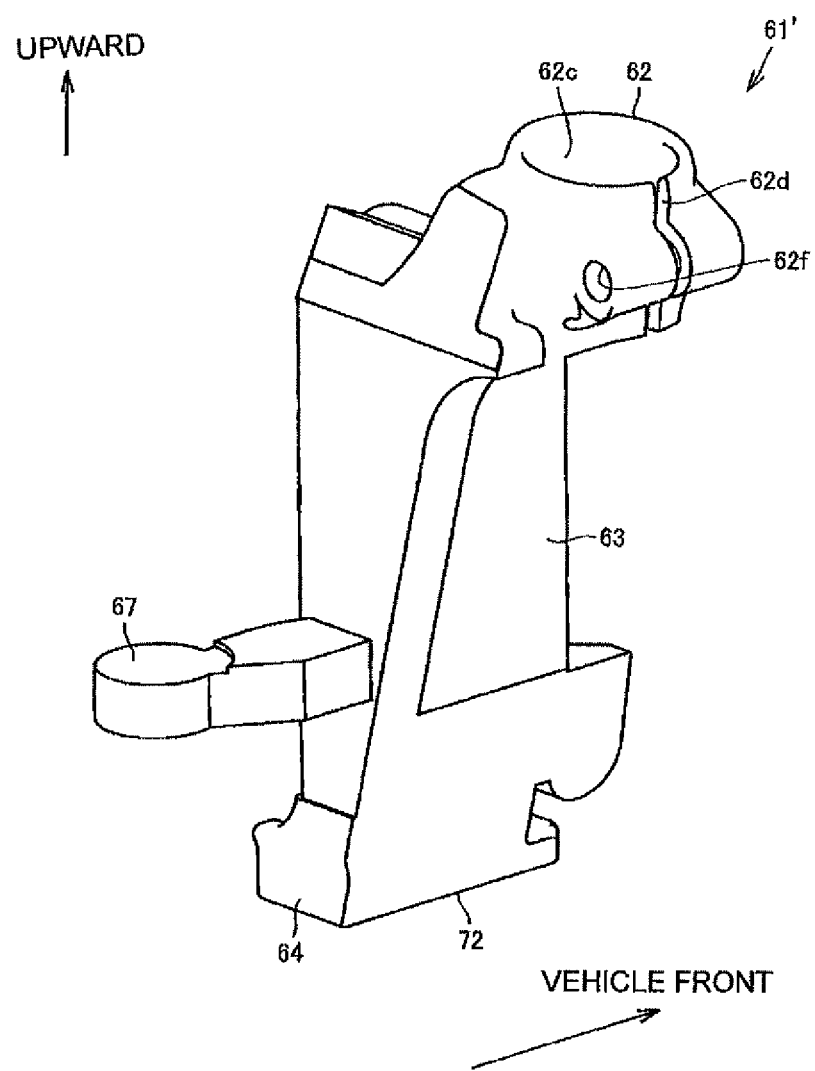
FIG. 18 is a perspective view showing the suspending bracket taken out from the second embodiment.

FIG. 15 is a front view showing the in-wheel motor drive device according to the second embodiment of the present invention together with the suspension device, and shows a state of being viewed from the vehicle width direction outside. FIG. 16 is a side view showing the second embodiment together with the suspension device, and shows a state of being viewed from behind the vehicle. FIG. 17A is a sectional view showing the suspending bracket of the second embodiment, and shows a state in which the suspending bracket is cut along the one plane indicated by A-A in FIG. 15 and the cut section is viewed in the direction of the arrow. FIG. 17B is a sectional view showing the in-wheel motor drive device of the second embodiment, and shows a state in which the in-wheel motor drive device is cut along the two planes indicated by B-B in FIG. 15 and the cut section is viewed in the direction of the arrow. FIG. 18 is a perspective view showing the suspending bracket taken out from the second embodiment. With respect to the second embodiment, the identical reference numerals are given to the configurations common to the above-described embodiments, the description thereof will be omitted, and different configurations will be described below.

The bolt 69 of the second embodiment is common to the first embodiment in the respect that a suspending bracket 61' is joined and fixed to the hub attachment 56. However, the bolt 69 as a fixing means is different from the second embodiment in the respect that it joins and fixes together the suspending bracket 61', the hub attachment 56, and the main body casing 43.

As shown in FIG. 17B, the main body casing 43 is composed of two members of the front surface portion 43*f* and the back surface portion 43*b*. A through hole 43*h*, which is a round hole, is formed in the front surface portion 43*f*. A through hole 43*i*, which is a round hole, is formed in the back surface portion 43*b*. These through holes 43*h* and 43*i* are arranged so as to correspond to the positions of the through holes 56*h* of the hub attachment 56.

Of the front surface portion 43*f*, the site where the through hole 43*h* is formed comes into contact with the other surface in the axis O direction of the hub attachment 56. Of the back surface portion 43*b*, the site where the through hole 43*i* is formed comes into contact with one surface in the axis O direction of the suspending bracket 61. Then, the through hole 56*h* of the hub attachment 56, the through hole 43*h* of the front surface portion 43*f*, the through hole 43*i* of the back surface portion 43*b*, and the female screw hole 66 of the suspending bracket 61 coincide with each other in this order, and extend in parallel with the axis O. The bolt. 69 is inserted into each of the through holes 56*h* of the hub attachment 56 from one side in the axis O direction. Each of the bolts 69 sequentially penetrates through the through hole 56*h* in one side of the axis O direction and the through holes 43*h* and 43*i* in the center portion of the axis O direction, and is screwed with the female screw hole 66 in the other side of the axis O direction. By tightening each of the bolts 69 as a fixing means, the hub attachment 56, the front surface portion 43*f*, the back surface portion 43*b*, and the suspending bracket 61 are fastened together. In the present embodiment, three bolts 69, three through holes 56*h* receiving the bolts 69, three through holes 43*h* receiving the bolts 69, three through holes 43*i* receiving the bolts 69, and three female screw holes 66 screwed with the bolts 69 are provided as fixing means. However, the bolts 69 and the like are not limited to a predetermined number, and a plurality of them may be provided around the outer ring 13.

Figure 19:
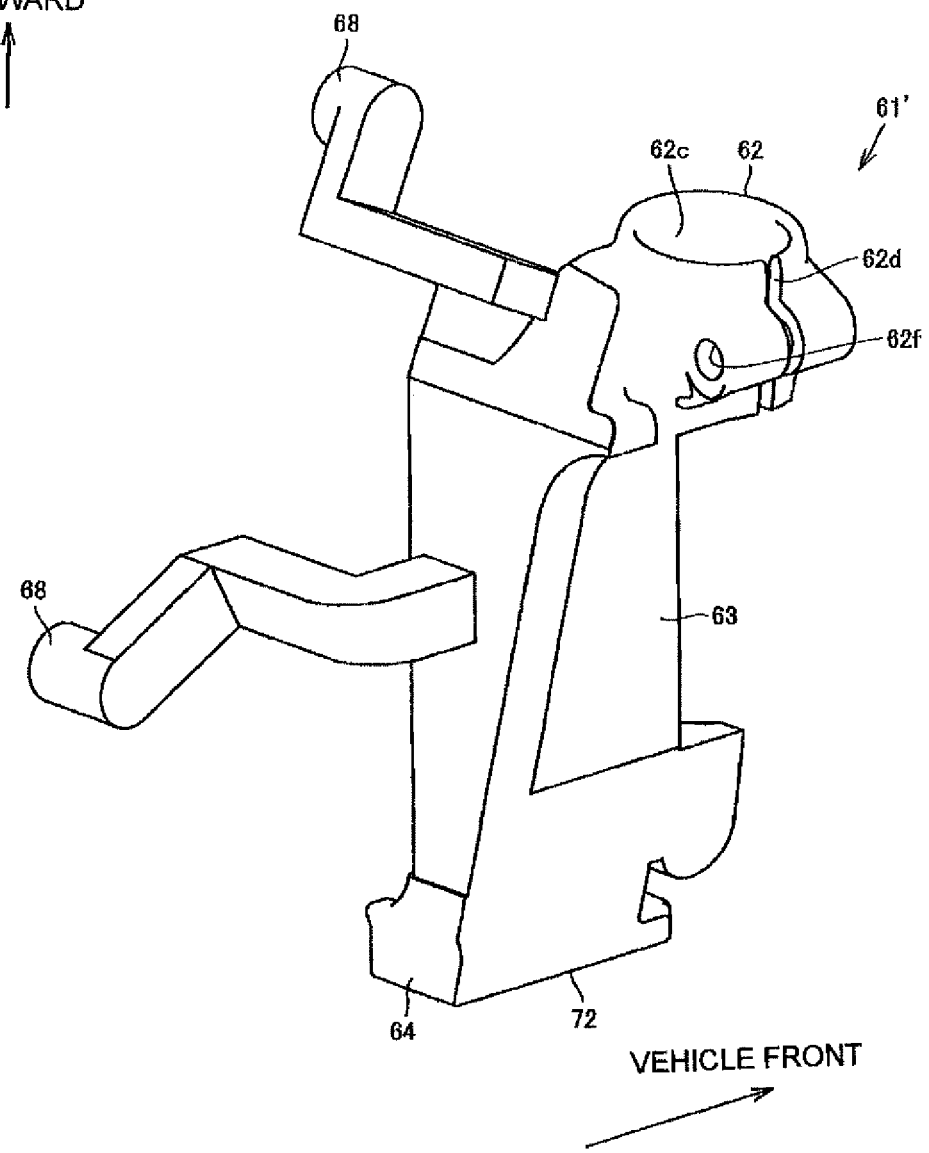
FIG. 19 is a perspective view showing the suspending bracket of a second variation.

Next, the suspending bracket according to a second variation will be described. FIG. 19 is a perspective view showing the suspending bracket of the second variation. With respect to this variation, the identical reference numerals are given to the configurations common to the above-described embodiments, the description thereof will be omitted, and different configurations will be described below. In the suspending bracket 61' of the second variation, the tie rod arm is omitted. Instead, the tie rod arm is integrally formed with, for example, the main body casing 43.

The suspending bracket 61' of the second variation further includes two brake caliper arms 68. One of the brake caliper arms 68 is formed integrally to the intermediate portion 63 of the suspending bracket 61. The other of the brake caliper arms 68 is formed integrally to the upper joining seat portion 62. As shown in FIG. 16, when the suspending bracket 61' is mounted and fixed to the vehicle width direction inside portion of the in-wheel motor drive device 10, one of the brake caliper arms 68 extends rearward of the vehicle and the other brake caliper arm 68 extends upward.

At the end of each of the brake caliper arms 68, a brake caliper joining seat portion, such as a female screw hole (not shown) for receiving a bolt, is formed. A brake caliper (not shown) is joined to the brake caliper joining seat portion at the end of each of the brake caliper arms 68, and the two brake caliper arms 68 support the brake caliper at the both sides. The brake caliper is arranged along the outer edge of the brake disc BD (FIG. 3) and puts a brake on the wheel (road wheel W) by clamping the brake disc BD. The brake caliper may be driven by hydraulic pressure or may be driven by an electric actuator, and thus the mechanism is not particularly limited. As a variation not shown, the suspending bracket 61' may include the tie rod arm 67 and the brake caliper arm 68.

Next, a suspending bracket of a third embodiment will be described.

Figure 20:
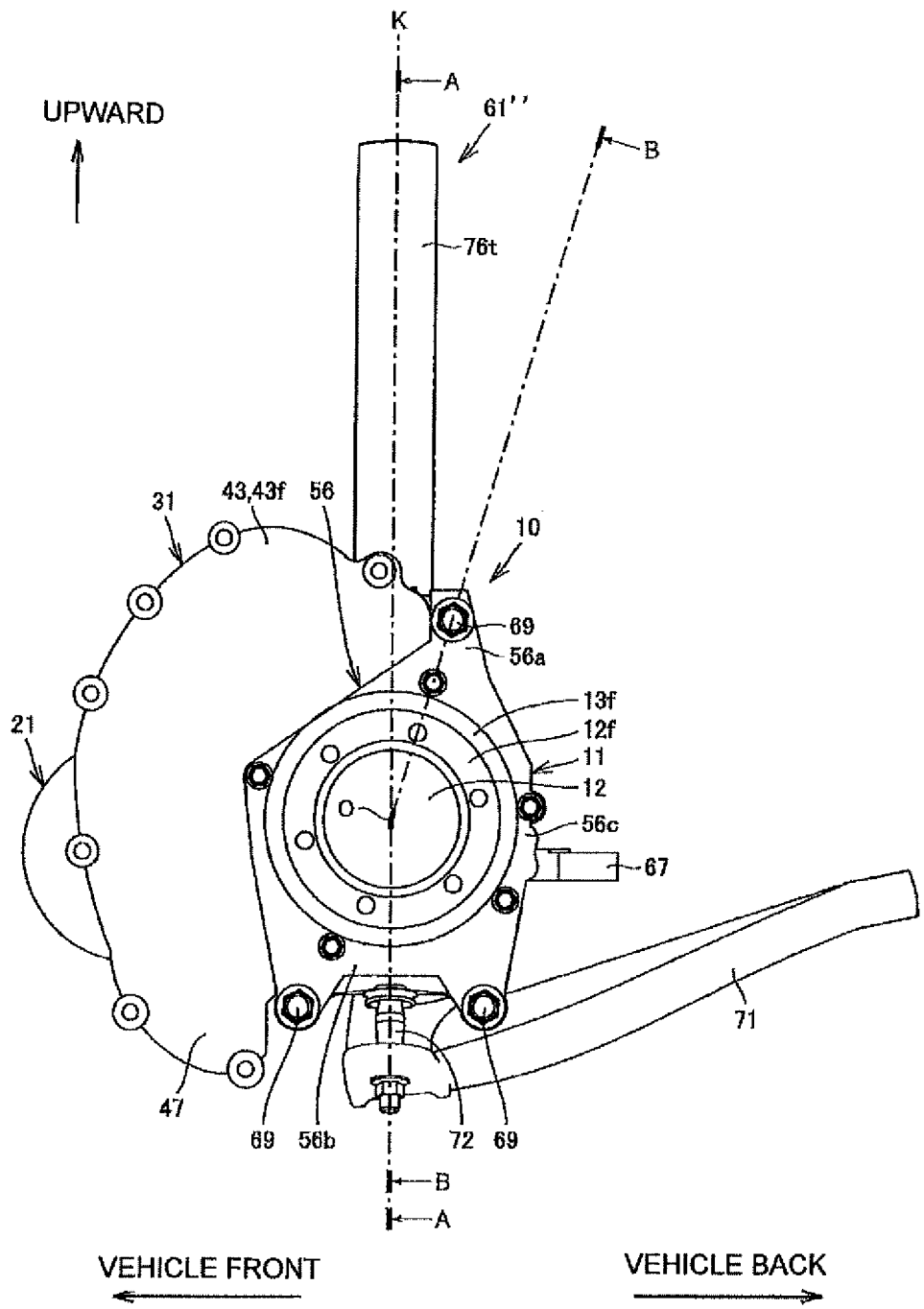
FIG. 20 is a front view showing an in-wheel motor drive device according to a third embodiment of the present invention together with a suspension device.
Figure 21:
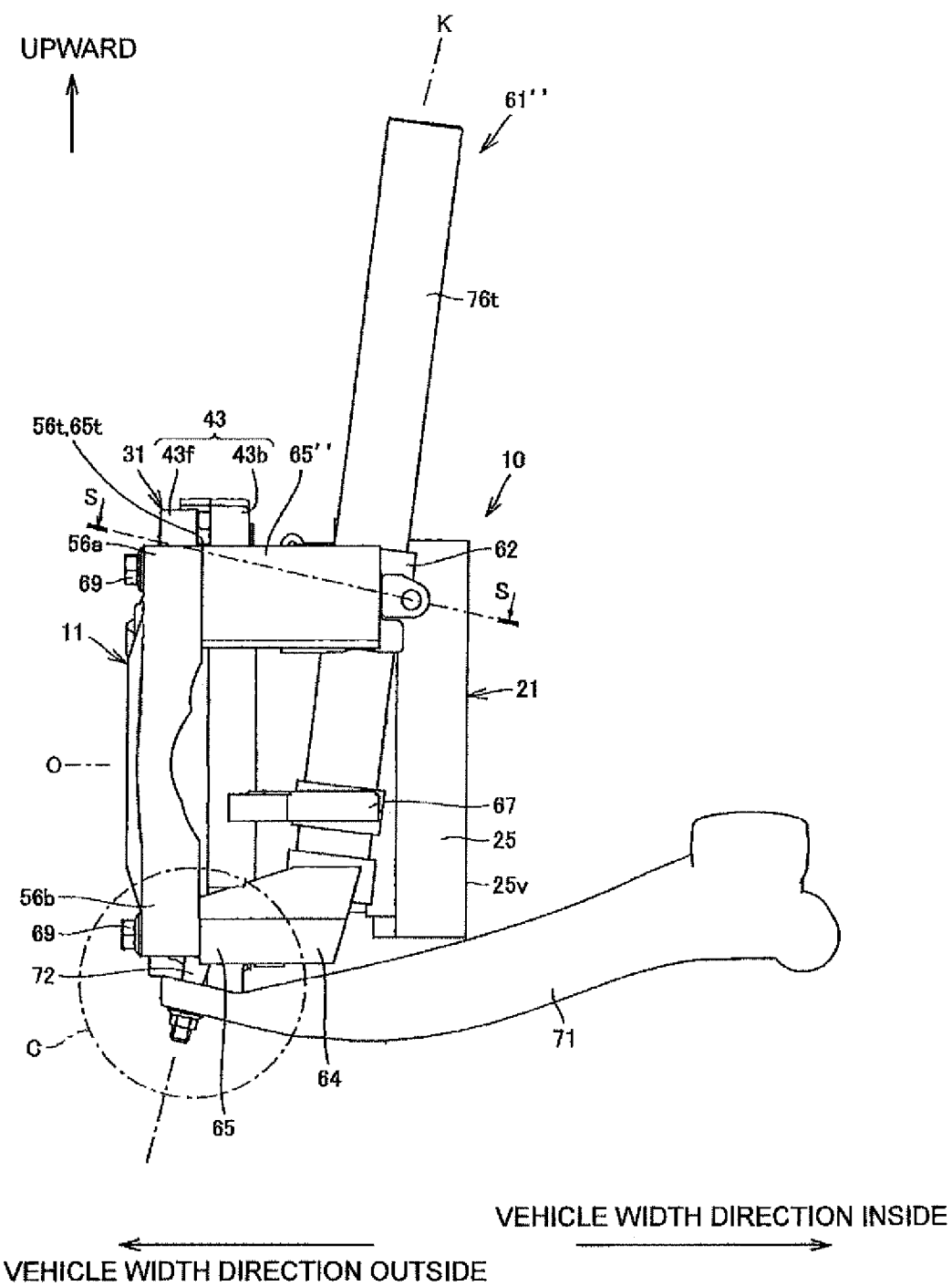
FIG. 21 is a side view showing the third embodiment.
Figure 22A:
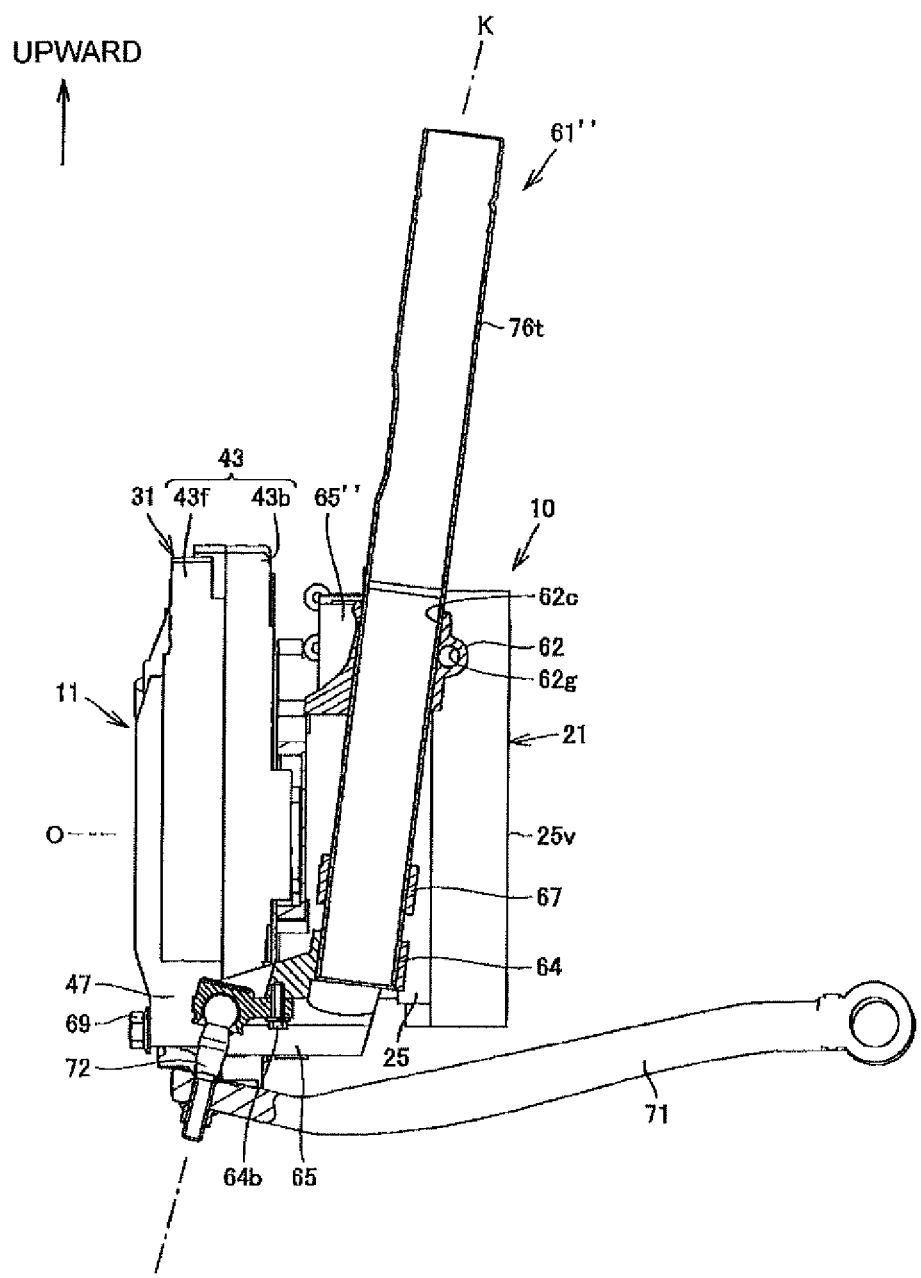
FIG. 22A is a sectional view showing the third embodiment.
Figure 22B:
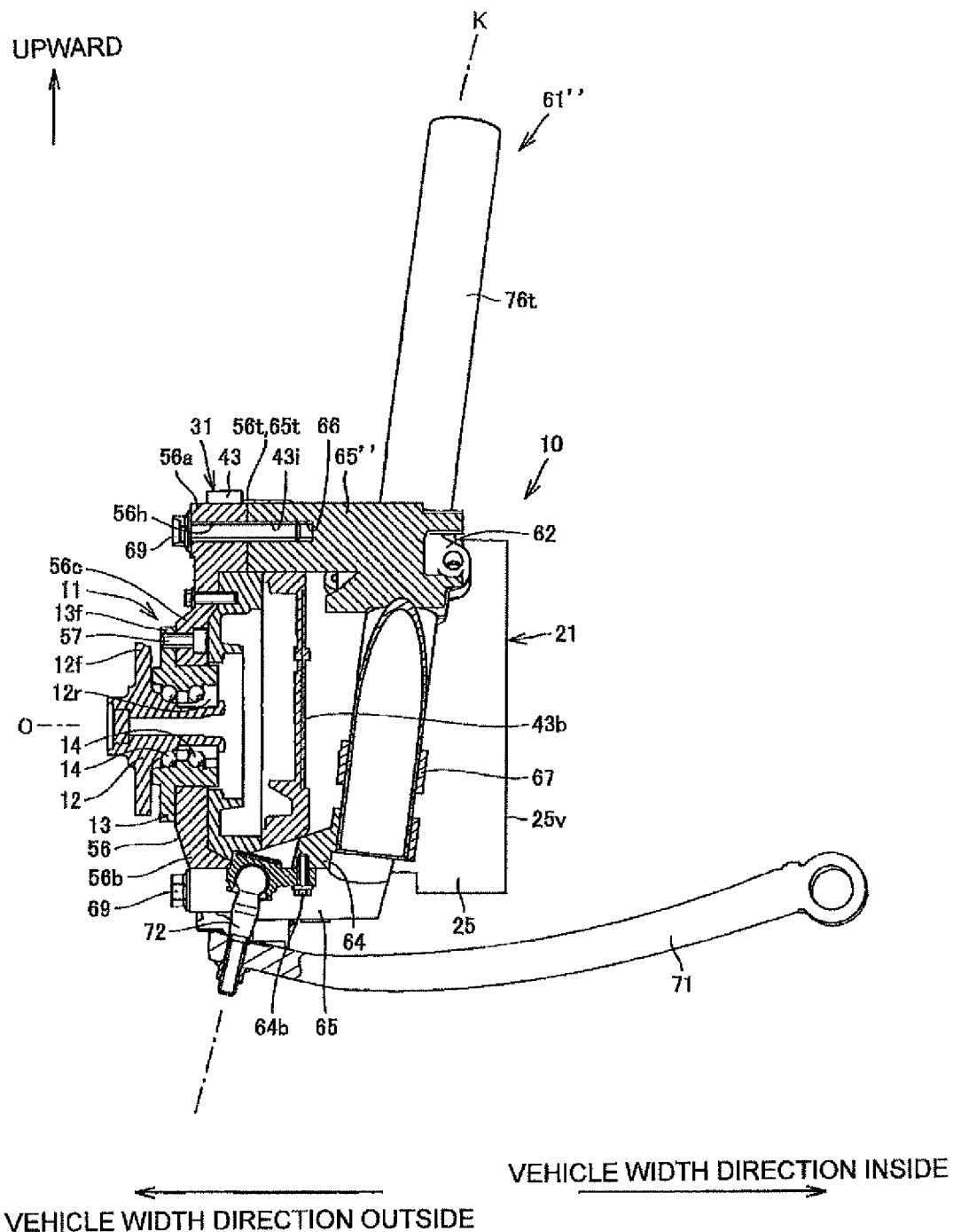
FIG. 22B is a sectional view showing the third embodiment.
Figure 23:
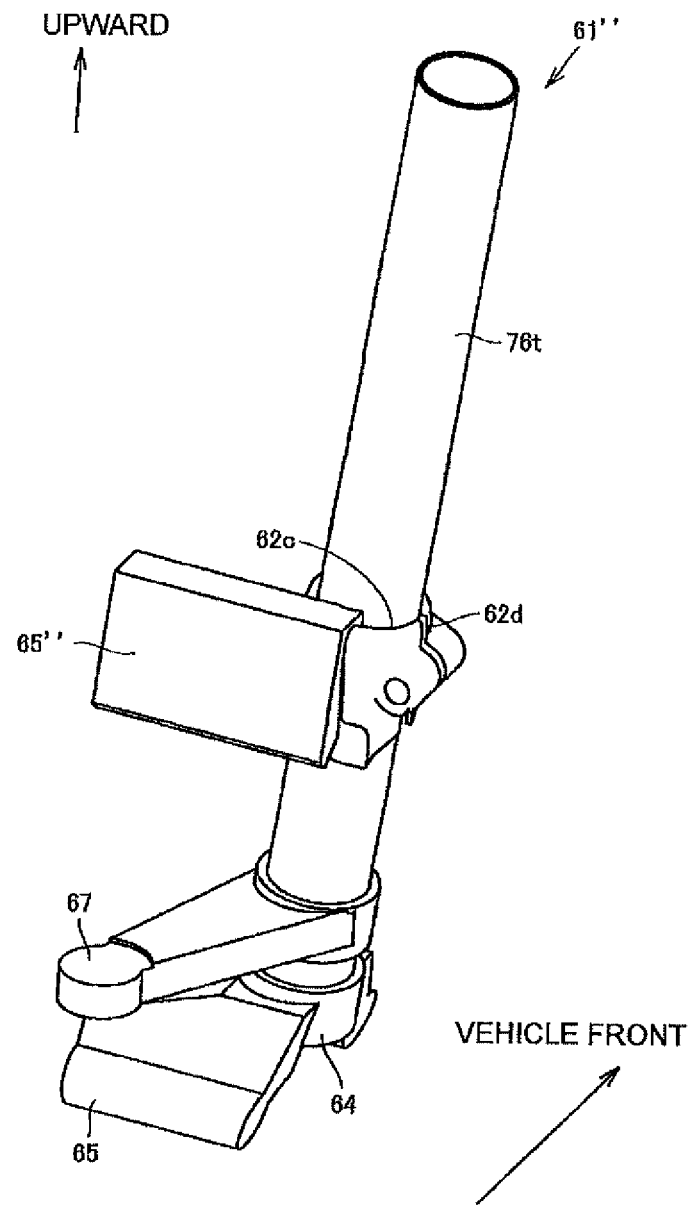
FIG. 23 is a perspective view showing the suspending bracket taken out from the third embodiment.

FIG. 20 is a front view showing an in-wheel motor drive device according to the third embodiment of the present invention together with a suspension device, and shows a state of being viewed from the vehicle width direction outside. FIG. 21 is a side view showing the third embodiment together with the suspension device, and shows a state of being viewed from behind the vehicle. FIG. 22A is a sectional view showing the suspending bracket of the third embodiment, and shows a state in which the suspending bracket is cut along the one plane indicated by A-A in FIG. 20 and the cut section is viewed in the direction of the arrow. FIG. 22B is a sectional view showing the in-wheel motor drive device of the second embodiment, and shows a state in which the in-wheel motor drive device is cut along the two planes indicated by B-B in FIG. 20 and the cut section is viewed in the direction of the arrow. FIG. 23 is a perspective view showing the suspending bracket taken out from the third embodiment. With respect to the third embodiment, the identical reference numerals are given to the configurations common to the above-described embodiments, the description thereof will be omitted, and different configurations will be described below.

A suspending bracket 61" of the third embodiment has a damper external cylinder 76t, the lower joining seat portion 64, the protruding portion 65, and a block 65". While the suspending bracket 61 of the first embodiment and the suspending bracket 61' of the second embodiment are each a single member, the suspending bracket 61" of the third embodiment is an assembly in which the separate members of the damper external cylinder 76t, the lower joining seat portion 64, and the block 65" are coupled.

The damper external cylinder 76t is a component of the damper and extends in the vertical direction. The lower joining seat portion 64 is mounted and fixed to the lower end portion of the damper external cylinder 76t. The protruding portion 65 is integrally formed with the lower joining seat portion 64 and protrudes from the lower joining seat portion 64 to the vehicle width direction outside. The block 65" is mounted and fixed to the outer circumference of the damper external cylinder 76t further upward than the lower joining seat portion 64. As shown in FIG. 22B, the block 65" extends in the vehicle width direction, has the female screw hole 66 in the vehicle width direction outside end surface, and has the through hole 62c, the slit 62d, the bolt 62e, the through hole 62f, and the female screw hole 62g (FIG. 8 and FIG. 9) in the vehicle width direction inside end. The damper external cylinder 76t passes through the through hole 62c, and the damper external cylinder 76t is mounted and fixed by tightening the bolt 62e.

As shown in FIG. 22B, the vehicle width direction outside end surface of the block 65" comes into contact with the other surface in the axis O direction of the hub attachment 56. The hub attachment 56 is joined and fixed to the block 65" by the bolt 69. The main body casing 43 is joined and fixed to the hub attachment 56 by a bolt (not shown).

The suspending bracket 61" further includes the tie rod arm 67. The tie rod arm 67 is mounted and fixed to the outer circumference of the damper external cylinder 76t further upward than the lower joining seat portion 64 and further downward than the block 65".

Figure 24:
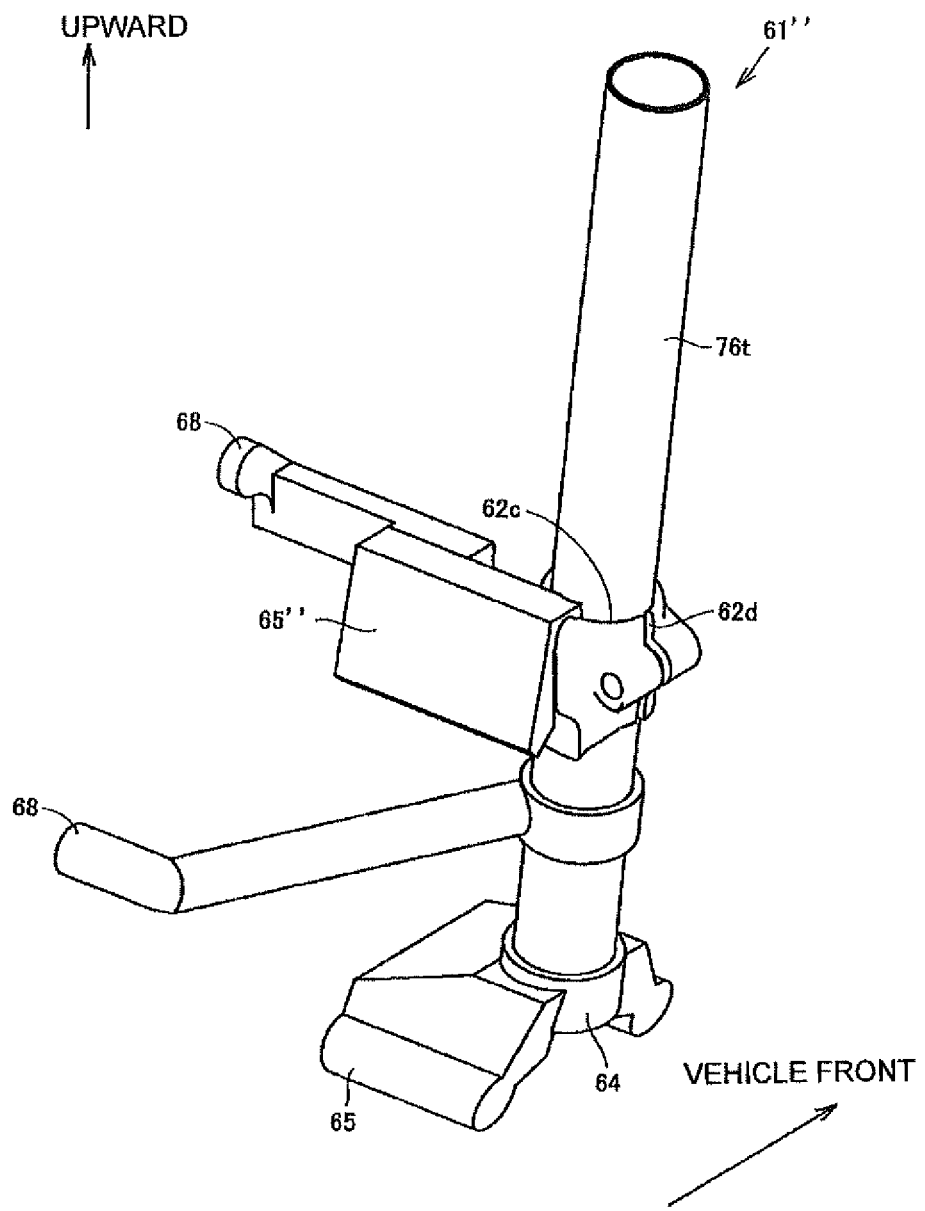
FIG. 24 is a perspective view showing the suspending bracket of a third variation.

Next, the suspending bracket according to a third variation will be described. FIG. 24 is a perspective view showing the suspending bracket of the third variation. With respect to this variation, the identical reference numerals are given to the configurations common to the above-described embodiments, the description thereof will be omitted, and different configurations will be described below. In the suspending bracket 61" of the third variation, the tie rod arm is omitted. Instead, the tie rod arm is integrally formed with, for example, the main body casing 43.

The suspending bracket 61" of the third variation further includes two brake caliper arms 68. One of the brake caliper arms 68 is formed integrally to the block 65". The other of the brake caliper arms 68 is mounted and fixed to the outer circumferential surface of the damper external cylinder 76t. As shown in FIG. 21, when the suspending bracket 61" is mounted and fixed to the vehicle width direction inside portion of the in-wheel motor drive device 10, one of the brake caliper arms 68 extends rearward of the vehicle and the other brake caliper arm 68 extends upward.

At the end of each of the brake caliper arms 68, a brake caliper joining seat portion, such as a female screw hole (not shown) for receiving a bolt, is formed. A brake caliper (not shown) is joined to the brake caliper joining seat portion at the end of each of the brake caliper arms 68, and the two brake caliper arms 68 support the brake caliper at the both sides. The brake caliper is arranged along the outer edge of the brake disc BD (FIG. 3) and puts a brake on the wheel (road wheel W) by clamping the brake disc BD. The brake caliper may be driven by hydraulic pressure or may be driven by an electric actuator, and thus the mechanism is not particularly limited. As a variation not shown, the suspending bracket 61" may include the tie rod arm 67 and the brake caliper arm 68.

According to the first to third embodiments, the strut 76 of the suspension device includes a damper. The suspending bracket 61 includes the upper joining seat portion 62 joinable with the strut 76, the lower joining seat portion 64 joinable with the lower arm 71 of the suspension device, and the intermediate portion 63 connecting between the upper joining seat portion 62 and the lower joining seat portion 64. The bolt 69 as a fixing means mounts and fixes the suspending bracket 61 to the hub attachment 56. As a result, even if an excessive external force is applied from the wheel side to the wheel hub bearing portion 11, the suspending bracket 61 can receive the excessive external force and transmit it to the suspension device. Therefore, the excessive external force is not transmitted to the main body casing 43, and it is possible to protect the in-wheel motor drive device 10 so as not to cause undesired deformation therein.

Further, according to the first embodiment, the main body casing 43 is interposed between the hub attachment 56 and the suspending bracket 61; the suspending bracket 61 has the protruding portion 65 extending toward the wheel hub bearing portion 11 and coming into contact with the hub attachment 56; and the bolt 69 as a fixing means mounts and fixes the protruding portion 65 to the hub attachment 56. Accordingly, an excessive external force can be directly transmitted from the wheel hub bearing portion 11 to the suspending bracket 61. Also in relation to the axis O direction of the wheel hub bearing portion 11, the wheel hub bearing portion 11, the main body casing 43, and the suspending bracket 61 can be arranged in this order.

Further, according to the first embodiment, as shown in FIG. 6B, the speed reduction portion 31 further includes the rolling bearings 41a and 41b arranged on one side and the other side of the axis O direction of the output gear 40, respectively, and rotatably support the output gear 40; and the end surface 65t of the protruding portion 65 is arranged so that the axis O direction position of the end surface 65t is included in the range R from the rolling bearing 41a on one side of the axis O direction to the rolling bearing 41b on the other side of the axis O direction.

According to the first embodiment, as shown in FIG. 5, the suspending bracket 61 and the hub attachment 56 define the opening V, which opens in a direction perpendicular to the axis O between them, and the main body casing 43 is exposed from the opening V.

Further, according to the second embodiment, the main body casing 43 is interposed between the hub attachment 56 and the suspending bracket 61; and the fixing means include the suspending bracket 61 aligned in the axis O direction, the main body casing 43, and the bolt 69 penetrating the hub attachment 56. Thus, the means for fixing the main body casing 43 to the wheel hub bearing portion 11 can be omitted.

Further, according to the first and second embodiments, the bolt 69 passing through the suspending bracket 61 and the hub attachment 56 is included as a fixing means; and three or more bolts 69 are present as shown in FIG. 4B and arranged further upward and downward than the axis O of the wheel hub bearing portion.

Further, according to the first and second embodiments, the main body casing 43 is formed in a plane perpendicular to the axis O, so as to protrude forward and rearward of the vehicle from the region of the triangle δ where adjacent bolts 69 are connected to each other with a straight line.

Further, according to the first and second embodiments, as shown in FIG. 5, the suspending bracket 61 and the steering axis K are arranged so as to overlap with each other as viewed in the vehicle front/rear direction.

Further, according to the first and second embodiments, as shown in FIG. 4B, the bolt 69 is arranged in the vehicle ahead and behind of the steering axis K.

Also, according to the first and second embodiments, the three members of the hub attachment 46, the output gear 40, and the suspending bracket 61 are arranged so as to overlap as viewed in the axis O direction. It is to be noted that the term "overlapping" as used here refers not to overlapping of any two members but to overlapping of the three members.

Further, according to the first and second embodiments, as viewed in the vehicle front/rear direction as shown in FIG. 5, the suspending bracket 61 and the stator 24 of the motor portion 21 are arranged so as to overlap as viewed in the vehicle front/rear direction.

According to the third embodiment, the suspending bracket 61" has the vertically extending damper external cylinder 76*t*, the lower joining seat portion 64 provided at the lower end portion of the damper external cylinder 76*t* and joinable with the lower arm 71, and the block 65" provided on the outer circumference of the damper external cylinder 76*t*. Due to this, the degree of freedom of the suspension device is increased by providing the block 65" as a separate member from the lower joining seat portion 64. Also, it is possible to lengthen the damper downward and bring the lower end of the damper external cylinder 76*t* close to the lower arm 71.

Further, according to the first to third embodiments, the suspending bracket 61/61'/61" further includes the tie rod arm 67, and a tie rod joining seat portion for joining with the tie rod of the steering device is formed at the end portion of the tie rod arm 67. This enables the in-wheel motor drive device 10 to be steered.

Further, according to the first to third variations, the suspending bracket 61/61'/61" further includes the brake caliper arm 68, and a brake caliper joining seat portion for joining with the brake caliper is formed at the end portion of the brake caliper arm 68. This enables the brake caliper to be attached to the in-wheel motor drive device 10.

While the embodiments of the present invention have been described with reference to the drawings, the present invention is not limited to the embodiments shown in the drawings. Various modifications and variations can be made to the illustrated embodiments within the identical scope to the present invention or within an equivalent scope.

INDUSTRIAL APPLICABILITY

The in-wheel motor drive device according to the present invention is advantageously used in electric vehicles and hybrid vehicles.

REFERENCE SIGNS LIST

10 in-wheel motor drive device
11 wheel hub bearing portion
12 inner ring
13 outer ring
14 rolling element
21 motor portion
31 speed reduction portion
40 output gear
41 output shaft
43 main body casing
43*b* back surface portion
43*f* front surface portion
56 hub attachment
56*a* upper side portion
56*b* lower side portion
56*c* circular portion
61 suspending bracket
62 upper joining seat portion
63 intermediate portion
64 lower joining seat portion
65 protruding portion
66 female screw hole
67 tie rod arm
68 brake caliper arm
71 lower arm
72 ball joint
76 strut
76*t* damper external cylinder
BD brake disc
K steering axis
W road wheel
Wr rim portion
Ws spoke portion

The invention claimed is:

1. An in-wheel motor drive device, comprising:
   a wheel hub bearing portion having an inner ring integrally rotating with a wheel, an outer ring facing the inner ring via a radial gap, a plurality of rolling elements interposed in the radial gap, and a hub attachment arranged on a more outer diameter side than the outer ring and mounted and fixed to the outer ring;
   a motor portion driving the inner ring;
   a casing housing a rotation transmission path from a motor rotation shaft of the motor portion to the inner ring;
   a suspending bracket having an upper joining seat portion and a lower joining seat portion joinable with a suspension device and an intermediate portion connecting the upper joining seat portion and the lower joining seat portion; and
   fixing means for mounting and fixing the suspending bracket to the hub attachment.

2. The in-wheel motor drive device according to claim 1, wherein:
   the casing is interposed between the hub attachment and the suspending bracket;
   the suspending bracket has a protruding portion extending towards the wheel hub bearing portion and coming into contact with the hub attachment; and
   the fixing means mounts and fixes the protruding portion to the hub attachment.

3. The in-wheel motor drive device according to claim 2, wherein:
   the rotation transmission path further includes a rolling bearing that includes an input gear coupled with the motor rotating shaft and an output gear coupled with the inner ring, is arranged on one side and the other side, respectively, in an axial direction of the output gear, and rotatably supports the output gear; and
   regarding an axis of the wheel hub bearing portion, an end surface of the protruding portion coming into contact with the hub attachment is arranged so that an axial direction position of the end surface is included in a range from the rolling bearing on one side in an axial direction to the rolling bearing on the other side in an axial direction.

4. The in-wheel motor drive device according to claim 2, wherein:
the suspending bracket has three or more of the protruding portions; and
regarding an axis of the wheel hub bearing portion, the suspending bracket and the hub attachment define an opening that opens in a direction perpendicular to an axis between the protruding portions adjacent to each other, and the casing is exposed from the opening.

5. The in-wheel motor drive device according to claim 1, wherein:
the casing is interposed between the hub attachment and the suspending bracket; and
the fixing means includes the suspending bracket aligned in the axial direction, the casing, and a bolt passing through the hub attachment.

6. The in-wheel motor drive device according to claim 1, wherein:
the fixing means has a bolt passing through the suspending bracket and the hub attachment; and
three or more of the bolts are present and arranged further upward and downward than an axis of the wheel hub bearing portion.

7. The in-wheel motor drive device according to claim 6, wherein the casing is formed in a plane perpendicular to an axis of the wheel hub bearing portion, so as to protrude forward and rearward of a vehicle from a polygonal region where the bolts adjacent to each other are connected to each other with a straight line.

8. The in-wheel motor drive device according to claim 6 or 7, wherein:
a steering axis of a wheel is further included; and
the suspending bracket and the steering axis are arranged so as to overlap with each other as viewed in a vehicle front/rear direction.

9. The in-wheel motor drive device according to claim 8, wherein the bolt is arranged in a vehicle ahead and behind of the steering axis.

10. The in-wheel motor drive device according to claim 1, wherein:
the rotation transmission path includes an input gear coupled with the motor rotation shaft and an output gear coupled with the inner ring; and
the hub attachment, the output gear, and the suspending bracket are arranged so as to overlap with one another as viewed in an axial direction of the wheel hub bearing portion.

11. The in-wheel motor drive device according to claim 1, wherein the suspending bracket and the motor portion are arranged so as to overlap with each other as viewed in a vehicle front/rear direction.

12. The in-wheel motor drive device according to claim 1, wherein the suspending bracket further includes a tie rod joining seat portion for joining with a tie rod of a steering device.

13. The in-wheel motor drive device according to claim 1, wherein the suspending bracket further includes a brake caliper joining seat portion for joining with a brake caliper.

14. An in-wheel motor drive device, comprising:
a wheel hub bearing portion having an inner ring integrally rotating with a wheel, an outer ring facing the inner ring via a radial gap, a plurality of rolling elements interposed in the radial gap, and a hub attachment arranged on a more outer diameter side than the outer ring and mounted and fixed to the outer ring;
a motor portion driving the inner ring;
a casing housing a rotation transmission path from a motor rotation shaft of the motor portion to the inner ring;
a suspending bracket having a vertically extending damper external cylinder, a lower joining seat portion provided at a lower end portion of the damper external cylinder and joinable with an arm of a suspension device, and a block provided on an outer circumference of the damper external cylinder; and
fixing means for mounting and fixing the block to the hub attachment.

* * * * *